United States Patent
Hirabayashi et al.

[11] Patent Number: 5,434,549
[45] Date of Patent: Jul. 18, 1995

[54] MOVING MAGNET-TYPE ACTUATOR

[75] Inventors: Yasuyuki Hirabayashi; Takatoshi Oyama; Hiroyuki Sohno; Sigeo Saito, all of Tokyo, Japan

[73] Assignee: TDK Corporation, Tokyo, Japan

[21] Appl. No.: 93,677

[22] Filed: Jul. 20, 1993

[30] Foreign Application Priority Data

| Nov. 12, 1992 | [JP] | Japan | 4-083991 U |
| Nov. 12, 1992 | [JP] | Japan | 4-083992 U |
| Apr. 26, 1993 | [JP] | Japan | 5-120354 |
| Jun. 7, 1993 | [JP] | Japan | 5-035519 U |
| Jul. 20, 1993 | [JP] | Japan | 4-213267 |

[51] Int. Cl.$^6$ .................. H01F 7/00; H01F 7/08
[52] U.S. Cl. ................................................ 335/229
[58] Field of Search ............ 335/179, 229–234, 335/222, 256, 266

[56] References Cited

U.S. PATENT DOCUMENTS

| 3,149,255 | 9/1964 | Trench . | |
| 4,363,980 | 12/1982 | Petersen . | |
| 4,407,578 | 10/1983 | Petersen | 354/235 |
| 4,641,072 | 2/1987 | Cummins | 318/687 |
| 4,785,816 | 11/1988 | Dow et al. | 128/660.1 |
| 4,895,505 | 1/1990 | Inaba et al. | 425/145 |
| 5,345,206 | 9/1994 | Morcos | 335/222 |

FOREIGN PATENT DOCUMENTS

| 888229 | 10/1981 | Belgium . |
| 0280743 | 9/1988 | European Pat. Off. . |
| 0457389 | 11/1991 | European Pat. Off. . |
| 1298381 | 6/1962 | France . |
| 61-41429 | 11/1986 | Japan . |
| 6609975 | 1/1967 | Netherlands . |

*Primary Examiner*—Leo P. Picard
*Assistant Examiner*—Ramon M. Barrera
*Attorney, Agent, or Firm*—Oblon, Spivak, McClelland, Maier & Neustadt

[57] ABSTRACT

In a moving magnet type actuator, a magnet moving body including at least two permanent magnets of which same poles are confronting each other and an intermediate magnetic substance. The magnet moving body is movably arranged inside at least three coils. The at least three coils are connected so that current flows in different directions with a zone between the permanent magnets as a boundary. Whereby thrust and efficiency of the moving magnet type actuator is improved.

16 Claims, 15 Drawing Sheets

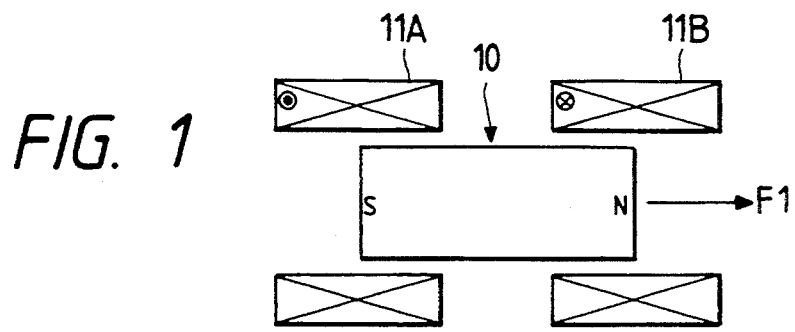
FIG. 1
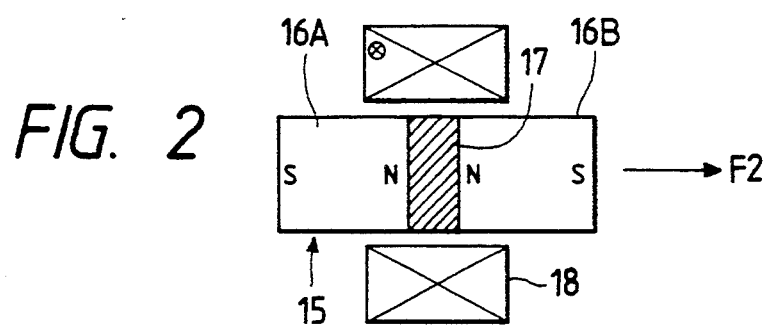
FIG. 2
FIG. 3A
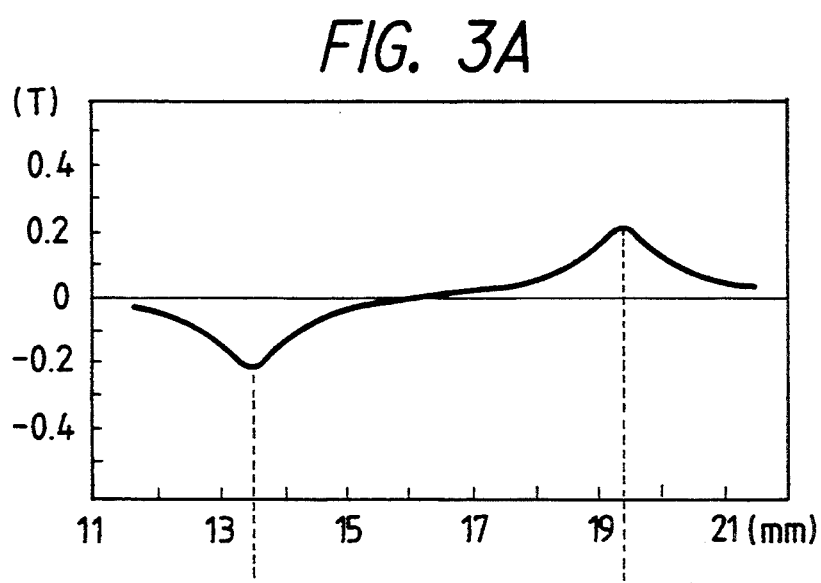
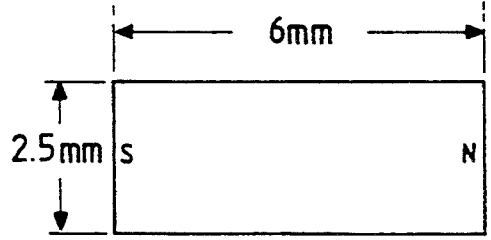
FIG. 3B

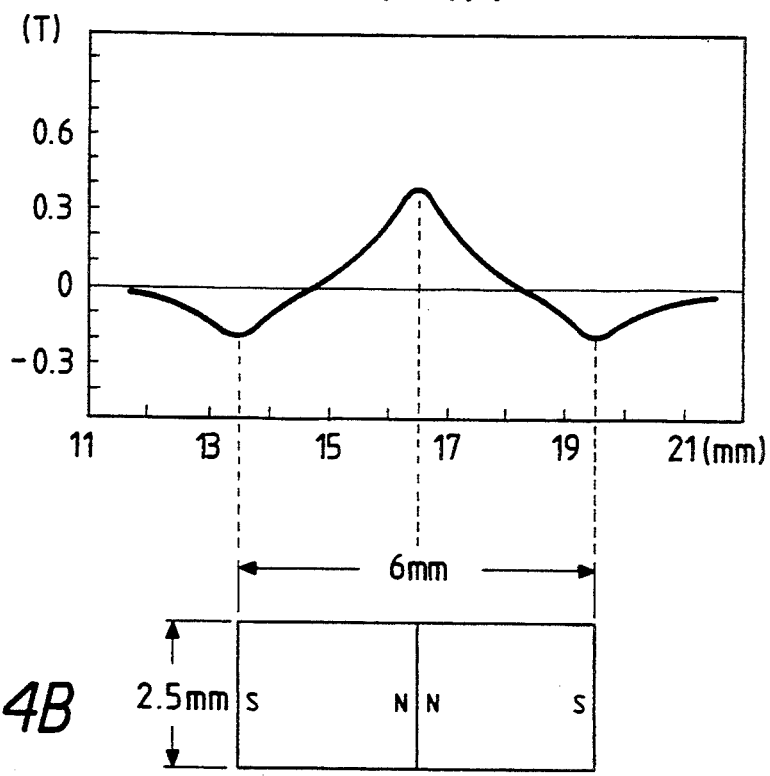
FIG. 4A
FIG. 4B
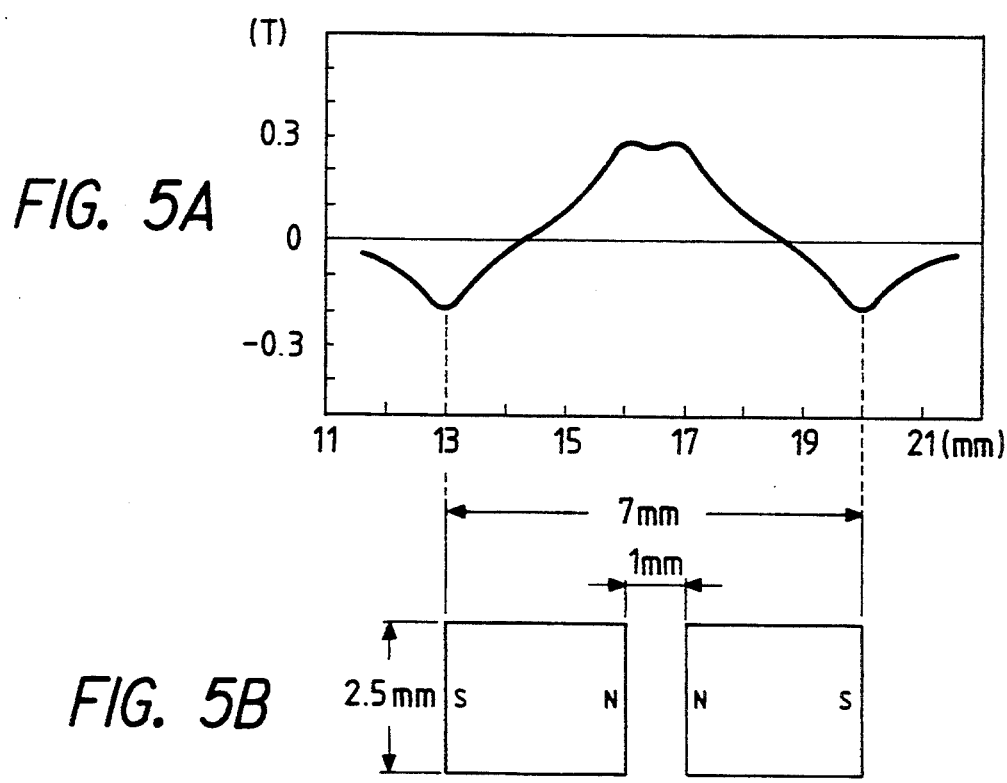
FIG. 5A
FIG. 5B

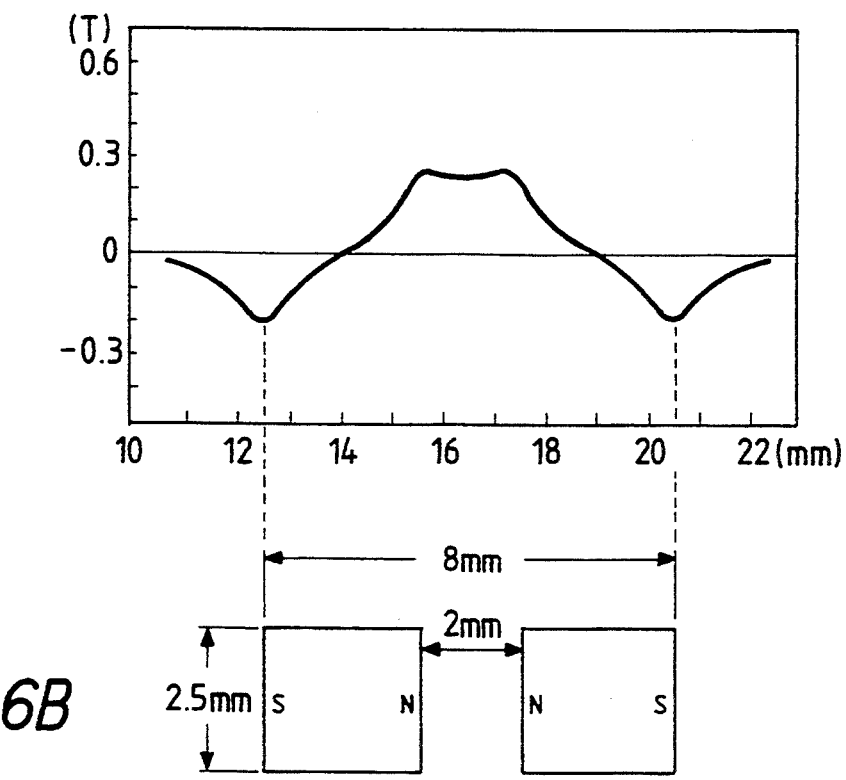
FIG. 6A
FIG. 6B
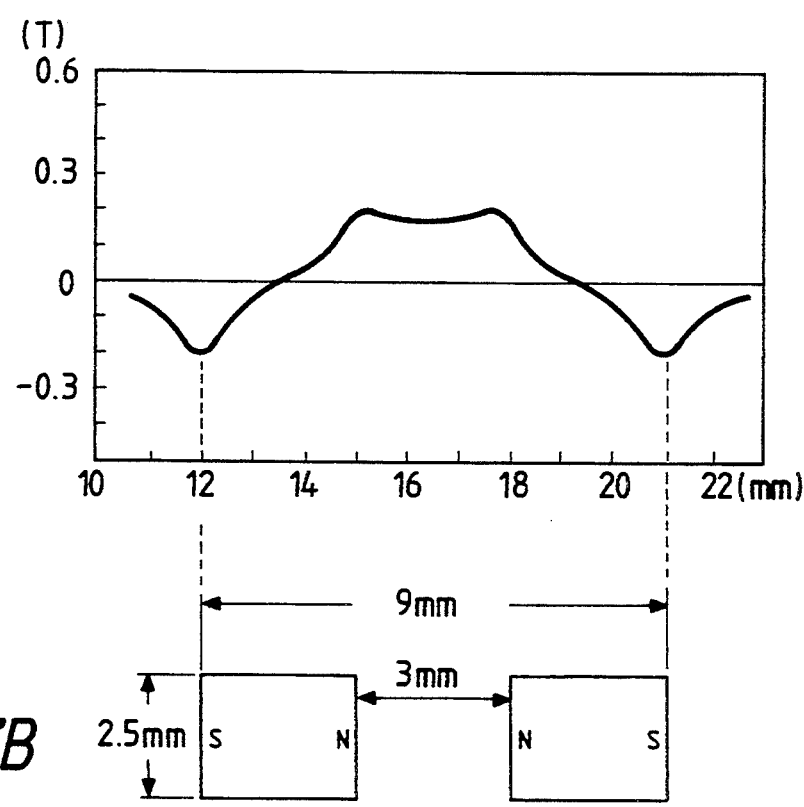
FIG. 7A
FIG. 7B

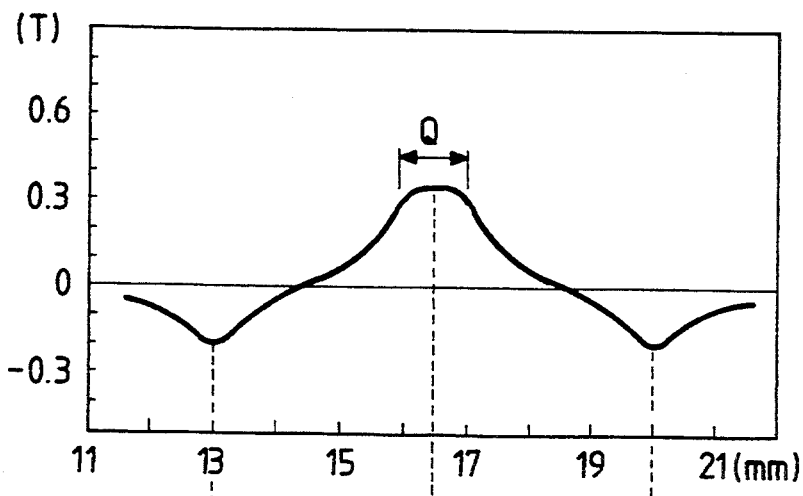
FIG. 8A
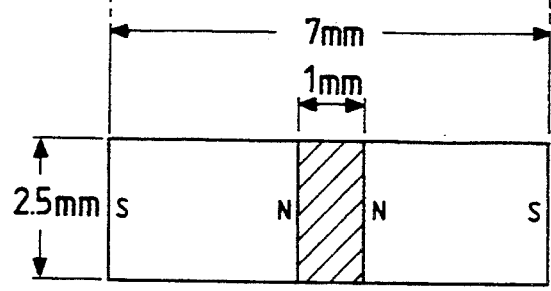
FIG. 8B
FIG. 9
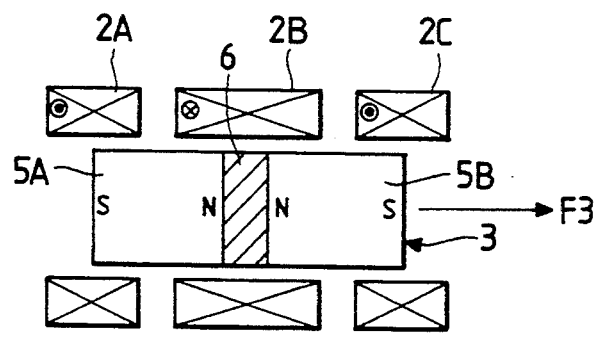

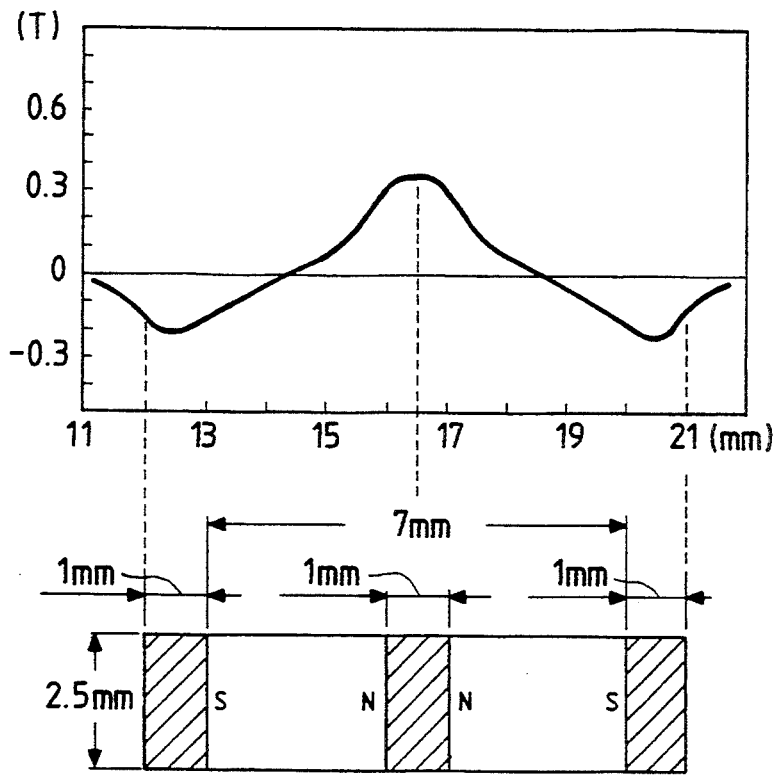
FIG. 23A
FIG. 23B
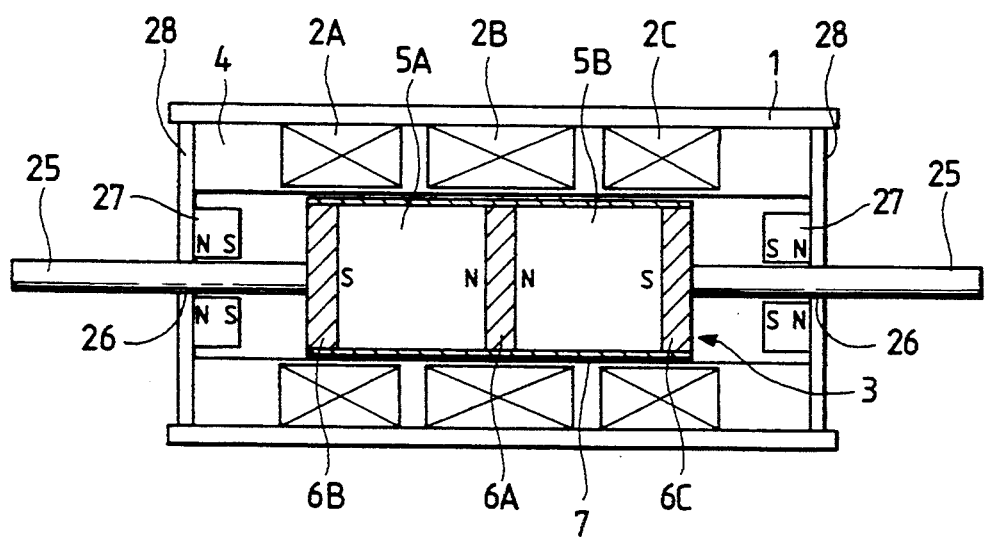
FIG. 24

MOVING MAGNET-TYPE ACTUATOR

BACKGROUND OF THE INVENTION

1. Field of the Invention

The invention relates to a moving magnet-type actuator for converting electrical energy into reciprocating kinetic energy or the like by electromagnetic action for use in control equipments, electronic equipments, machine tools and the like.

2. Description of the Related Art

Conventionally, moving magnet-type reciprocating devices have a structure such as shown in a first conventional example of FIG. 1 and a structure such as shown in a second conventional example of FIG. 2.

In the first conventional example shown in FIG. 1, reference numeral 10 designates a magnet moving body made of a bar-shaped permanent magnet magnetized in the axial direction. This bar magnet moving body has magnetic poles at both ends thereof. Coils 11A, 11B are wound around annularly the outer circumferences of both end portions of the magnet moving body 10 in such a manner that the same poles are generated at neighboring portions thereof. Although not shown in FIG. 1, the coils 11A, 11B are usually installed into a nonmagnetic guide sleeve member for movably guiding the magnet moving body 10 in the axial direction. Magnetic flux from the respective end surfaces of the magnet moving body 10 links with the respective coils 11A, 11B.

In the second conventional example shown in FIG. 2, a magnet moving body 15 is formed by firmly integrating two bar-shaped permanent magnets 16A and 16B with a bar-shaped magnetic substance 17 in such a manner that the same poles of the permanent magnets confront each other and that the magnetic substance is interposed between the permanent magnets. A coil 18 is wound annularly around the outer circumference of the middle portion of the magnet moving body 15. Although not shown in FIG. 2, the coil 18 is usually installed into a nonmagnetic guide sleeve member for movably guiding the magnet moving body 15 in the axial direction. Magnetic flux from the end surfaces of the permanent magnets with the same poles thereof confronting each other in the magnet moving body 15 links with the coil 18.

As the second conventional example shown in FIG. 2, the magnet moving body in which same poles of magnets are confronting each other is disclosed in U.S. Pat. No. 4,363,980.

By the way, in the first and second conventional examples, a force to be generated at the magnet moving bodies 10 or 15 is produced based on the Fieming's left hand rule. The Fieming's left hand rule is applied to coils. Since the coils are fixed in the above cases, a thrust is produced at the magnet moving body as reaction against force acting on the coils. Therefore, what contributes to producing a thrust is a vertical component of the magnetic flux from the permanent magnets of the magnet moving body (the component perpendicular to the direction of magnetization of the permanent magnets).

How the vertical component of the magnetic flux behaves was analyzed in two cases: a case where only one permanent magnet was used and a case where two permanent magnets arranged so that the same poles confront each other were used.

FIG. 3 shows a result obtained from a magnetic field analysis of the vertical component of the surface magnetic flux density made along with the longitudinal side surface of a single permanent magnet. The permanent magnet used in the analysis was a rare-earth permanent magnet whose diameter was 2.5 mm and whose length was 6 mm. Measurements were made at positions 0.25 to 0.45 mm distant from the surface of the permanent magnet.

FIGS. 4 to 7 show results obtained from magnetic field analysis of the vertical component of the surface magnetic flux density made along the longitudinal side surface of two permanent magnets in the cases where the two permanent magnets are arranged so that the same poles thereof confront each other with confronting gaps of 0, 1, 2, 3 mm, respectively. Each of the permanent magnets used was a rare-earth permanent magnet whose diameter was 2.5 mm and whose length was 3 mm. Measurements were made at positions 0.25 to 0.45 mm distant from the surface of the permanent magnets.

FIG. 8 shows a result obtained from a magnetic field analysis of the vertical component of the surface magnetic flux density made along the longitudinal side surface of two permanent magnets in a case where the two permanent magnets are arranged so that the same poles thereof confront each other while interposing a 1 mm-long magnetic substance therebetween. Each of the permanent magnets used was a rare-earth permanent magnet whose diameter was 2.5 mm and whose length was 3 mm. Measurements were made at positions 0.25 to 0.45 mm distant from the surface of the permanent magnets.

As described above, the force produced at the magnet moving body is based on the Fieming's left hand rule, and it is desired that the vertical component of the magnetic flux of the permanent magnets which cuts across the coils (the component perpendicular to the axial direction of the permanent magnets) be large in quantity. However, in the first conventional example shown in FIG. 1, the vertical component of the surface magnetic flux density is as shown in FIG. 3, verifying that the vertical component in the first conventional example was smaller compared with the cases where the two permanent magnets were arranged with the same poles thereof confronting each other such as shown in FIGS. 4 to 8. Therefore, it is limited the improvement of the thrust by the configuration of the first conventional example shown in FIG. 1. For example, a force F1 of only 4.7 (gf) was produced under the condition that the magnet moving body 10 was formed of a rare-earth permanent magnet of 2.5 mm in diameter and 6 mm in length and that a current of 40 mA was applied to the two coils 11A, 11B so that the same poles can be generated at the neighboring portions of the coils 11A, 11B.

On the other hand, in the second conventional example of FIG. 1, the magnet moving body 15 interposing the magnetic substance between the two permanent magnets with the same poles thereof confronting each other was used. The vertical component of the magnetic flux density in the second conventional example is as shown in FIG. 8, which indicates that the magnetic flux produced from the magnetic poles of the permanent magnets 16A and 16B arranged so that the same poles thereof confront each other was larger than in the case of a single permanent magnet (see FIG. 3) or of only two permanent magnets (see FIGS. 4 to 7). However, it is only one coil that was involved in this configuration that surrounds the middle portion of the magnet moving body 15, and this configuration seems to leave the magnetic flux produced from the magnetic poles at both ends of the magnet moving body 15 not utilized effectively. It was thus difficult to improve thrust also in the second conventional example of FIG. 2. For example, in the second conventional example of FIG. 2, a force F2 of only 5.6 (gf) was produced when the same power consumption as in the first conventional example was achieved under the condition that a current of 40 mA was applied to the coil 18 while using a magnet moving body that Was formed by interposing a 1 mm-long magnetic substance between two rare-earth permanent magnets as the magnet moving body 15. The coil 18 was prepared so that the same power consumption as in the first conventional example of FIG. 6 could be obtained. Each of the two permanent magnets was 2.5 mm in diameter and 3 mm in length (the performance of the rare-earth permanent magnet was the same as that of the first conventional example).

If the magnet moving body is formed by combining a plurality of permanent magnets and magnetic substances, then these components must be unified with one another surely. Further, if the actuator is formed by arranging an output extracting pin or pins on the permanent magnets, it is desirable to eliminate unnecessary play of the magnet moving body and the output extracting pins. This point must therefore be taken into consideration.

SUMMARY OF THE INVENTION

The device has been made in view of the above circumstances. Accordingly, the object of the device is to provide a magnet moving-type actuator which can improve thrust and efficiency by using a magnet moving body formed of at least two permanent magnets with the same poles thereof confronting each other and effectively utilizing magnetic flux produced from the magnetic poles of the permanent magnets, which can fix the permanent magnets surely and assemble the magnet moving body easily, and which permits smooth movement of the magnet moving body.

To achieve the above object, the invention is applied to a moving magnet-type actuator that includes a magnet moving body formed by interposing a magnetic substance between at least two permanent magnets with the same poles of the permanent magnets confronting each other. The magnet moving body is movably arranged inside at least three coils. The at least three coils are connected so that current flows in different directions with a zone between the poles of the permanent magnets as a boundary.

Further, the permanent magnets and the intermediate substance may be enclosed in a nonmagnetic holder to form the magnet moving body.

Furthermore, an output extracting pin may be provided on at least one outer end surface of the permanent magnets. The output extracting pin is slidably supported by a bearing member which is supported with a predetermined positional relationship with respect to the three coils.

Still further, the magnet moving body may be formed by fixing permanent magnets and an intermediate magnetic substance interposed between the permanent magnets on a through shaft body passing through the permanent magnets and the intermediate magnetic substance.

The actuator of the invention may also be designed so that a sleeve-like magnetic substance is arranged on the outer circumference of the coils to form a magnetic circuit for increasing a magnetic flux component in a direction perpendicular to a direction in which the permanent magnets are magnetized.

Further, outer end magnetic substances may be arranged on outer end surfaces of the permanent magnets positioned at both outer ends of the magnet moving body.

Still further, a magnetic attracting body for attracting the magnet moving body may be arranged on at least one end of the nonmagnetic guide sleeve on which the at least three coils are fixed.

Still further, springs for basing the magnet moving body back to end positions of the nonmagnetic guide sleeve or return permanent magnets for generating repulsive force against the magnet moving body may be arranged.

The operational concept of the moving magnet-type actuator of the invention will be described with reference to a schematic configurational diagram of FIG. 9. In FIG. 9, a magnet moving body 3 is formed by integrating two cylindrical permanent magnets 5A and 5B with a cylindrical magnetic substance 6 firmly interposed between these permanent magnets 5A and 5B, the same poles of the permanent magnets confronting each other. This is a structure in which the vertical component of the magnetic flux density (the component perpendicular to the axial direction of the permanent magnets) is produced in large quantities as shown in FIG. 8. Coils 2A, 2B and 2C are wound around the outer circumference of the magnet moving body 3 and are arranged so that magnetic flux from the magnetic pole of the left end of the permanent magnet 5A, from the ends of the permanent magnets 5A, 5B at which the same poles confront each other, and from the right end of the permanent magnet 5B cuts across these coils. These coils 2A, 2B, 2C are connected so that current flows in different directions with a zone between the poles of the permanent magnets 5A, 5B as a boundary (the boundary in the zone between the magnetic poles does not necessarily coincide with the midpoint between the magnetic poles as long as the boundary stays at some point between the magnetic poles). Although not shown, the coils 2A, 2B, 2C are usually installed into a nonmagnetic guide sleeve for movably guiding the magnet moving body 3 in the axial direction. The positional relationship between the coils 2A, 2B, 2C and the magnet moving body 3 is such that the currents flowing through the respective coils are opposite to one another with the zone between the poles of the permanent magnets as a boundary in all the range along which the magnet moving body 3 can move.

The structure of the magnet moving body 3 in FIG. 9 is such that the two permanent magnets are arranged so that the same poles thereof confront each other and the magnetic substance is interposed between the permanent magnets as shown in FIG. 8. The vertical component of the surface magnetic flux density in an area Q corresponding to the position of the magnetic substance in the case of FIG. 8 is better than in the cases of FIGS. 4 to 7 in which no magnetic substance is used (the peak for a magnetic flux density of 0.3 T or more is wide and high.)

As described above, the magnet moving body 3 formed by interposing the magnetic substance between the two permanent magnets 5A, 5B with the same poles of the permanent magnets confronting each other can increase the magnetic flux component perpendicular to the longitudinal direction of the magnet moving body 3, such magnetic flux component contributing to producing a force based on the Fieming's left hand rule. In addition, since the three coils 2A, 2B, 2C link with the magnetic flux from all the magnetic poles of the permanent magnets effectively, a large thrust that could have never been produced by the conventional examples can be produced by applying current to the three coils 2A, 2B, 2C so that a magnetic field of opposite polarity can be generated alternately. If the current applied to the respective coils is inverted, so is the direction of the thrust of the magnet moving body 3. When alternating current is applied, the magnet moving body 3 functions as a vibrator that repeats vibrating at a predetermined cycle.

In the case of FIG. 9, a force F3 of 6.7 (gf) was produced when the same power consumption was achieved under the condition that a current of 40 mA was applied to the three coils 2A, 2B, 2C while using a magnet moving body formed by interposing a 1 mm-long magnetic substance between two rare-earth permanent magnets as the magnet moving body 3. The coils 2A, 2B, 2C were prepared so that the same power consumption as in the first and second conventional examples of FIGS. 1 and 2 could be achieved. Each of the two permanent magnets was 2.5 mm in diameter and 3 mm in length (the performance of the rare-earth permanent magnet was the same as the one used in the first conventional example). The obtained thrust F3 was about 1.42 times the thrust produced in the first conventional example and about 1.2 times that produced by the second conventional example under the same power consumption. It is understood from this result that the magnet moving body 3 of FIG. 9 is much better than the first and second conventional examples.

A curve (a) of FIG. 10 shows a relationship between the displacement in the axial direction and the thrust (gf) of the magnet moving body 3 in the case where a sleeve-like magnetic substance at outer circumference of coils is not provided in FIG. 9. In the graph of FIG. 10, the dimensions and characteristics of the permanent magnet was the same as in FIG. 8; the zero displacement was defined as a state in which the midpoint of the magnet moving body 3 coincides with the midpoint of the coil 2B in the middle; and the current flowing through each coil was 40 mA.

As described above, the moving magnet-type actuator includes the magnet moving body formed of a structural body combining the permanent magnets arranged with the same poles thereof confronting each other. Therefore, the magnetic flux density component perpendicular to the direction of magnetization of the permanent magnets (the axial direction) can be increased to a sufficient degree. In addition, since the magnetic flux produced at all the magnetic poles of the permanent magnets can be utilized effectively, a thrust to be produced between the magnetic flux and the current flowing through the three coils wound around the outer circumference of the magnet moving body based on the Fieming's left hand rule can be sufficiently increased. Consequently, a large thrust can be produced by a small structure and a small current.

Further, in the case of where the permanent magnets and the intermediate magnetic substance disposed between the permanent magnets are accommodated and fixed in the nonmagnetic sleeve holder, the magnet moving body can be made rigid. Consequently, it can be prevent the permanent magnets and the magnetic substance from separating from others, thereby improve the reliability thereof.

Further, the output extracting pin is provided with the magnet moving body and the pin is slidably supported by the bearing member. This feature contributes to eliminating unnecessary play of the magnet moving body and the output extracting pin and to ensuring the operational stability by permitting the pin to slide smoothly in the axial direction.

Furthermore, the magnet moving body is formed by fixing the permanent magnets and the magnetic substance interposed between the permanent magnets on the through shaft body that passes through both the permanent magnets and the magnetic substance. As a result of the configuration, the permanent magnets and the magnetic substance can be fixed surely on the through shaft body, thus facilitating the assembling work therefor. In addition, the through shaft body is supported slidably, so that the magnet moving body can move inside the respective coils smoothly without play. The ends of the through shaft body can be used as output extracting pins.

Furthermore, the outer end magnetic substances are provided on both outer ends of the magnet moving body, so that the magnetic flux component perpendicular to the longitudinal direction of the magnet moving body is increased. Such magnetic flux component contributes to produce a forth based on the Fieming's left hand rule, so that a much larger thrust can be obtained.

Still furthermore, according to the configuration of the present invention, a force which acts in a direction perpendicular to a direction of the thrust (moving direction of the magnet moving body) can be made extremely small.

BRIEF DESCRIPTION OF THE DRAWINGS

FIG. 1 is a schematic configurational diagram showing a first conventional example;

FIG. 2 is a schematic configurational diagram showing a second conventional example;

FIG. 3 is a graph showing a vertical component of a surface magnetic flux density on a longitudinal side surface of a single permanent magnet (the vertical component being perpendicular to the longitudinal side surface that is parallel to the magnetization direction of the permanent magnet);

FIG. 4 is a graph showing the vertical component of the surface magnetic flux density on the longitudinal side surface in the case where two permanent magnets are brought into direct contact with the same poles thereof confronting each other;

FIG. 5 is a graph showing the vertical component of the surface magnetic flux density on the longitudinal side surface in the case where two permanent magnets are arranged with the same poles thereof confronting each other through an air gap of 1 mm;

FIG. 6 is a graph showing the vertical component of the surface magnetic flux density on the longitudinal side surface in the case where two permanent magnets are arranged with the same poles thereof confronting each other through an air gap of 2 mm;

FIG. 7 is a graph showing the vertical component of the surface magnetic flux density on the longitudinal side surface in the case where two permanent magnets are arranged with the same poles thereof confronting each other through an air gap of 3 mm;

FIG. 8 is a graph showing the vertical component of the surface magnetic flux density on the longitudinal side surface in the case where two permanent magnets are arranged with the same poles confronting each other through a magnetic substance;

FIG. 9 is a schematic diagram showing a basic configuration of the invention;

FIG. 23 is a graph showing the vertical component of the surface magnetic flux density on the longitudinal side surface in the case where two permanent magnets are arranged with the same poles thereof confronting each other through an intermediate soft magnetic substance and where outer end soft magnetic substances are also arranged on both sides of the permanent magnets;

FIG. 24 is a front sectional view showing a seventh embodiment of the invention;

DETAILED DESCRIPTION OF PREFERRED EMBODIMENTS

Moving magnet-type actuators, which are embodiments of the invention, will hereunder be described.

Figure 11:
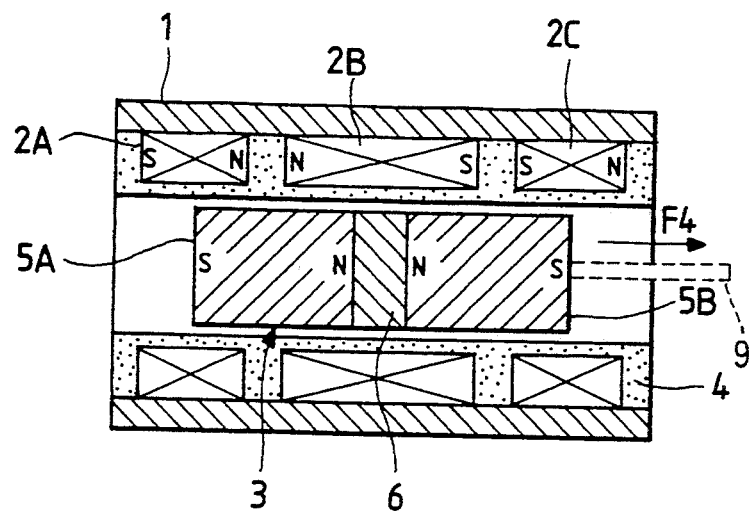
FIG. 11 is a front sectional view showing a moving magnet-type actuator of a first embodiment of the invention.
Figure 12:
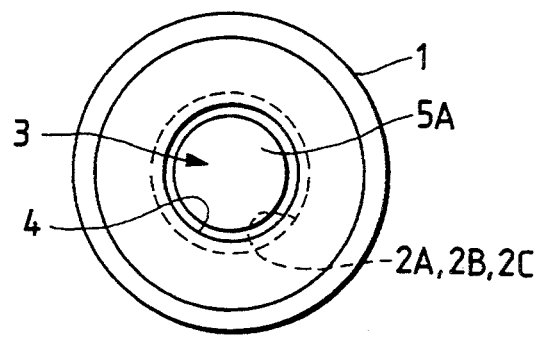
FIG. 12 is a side view of the moving magnet-type actuator shown in FIG. 11.
Figure 32:
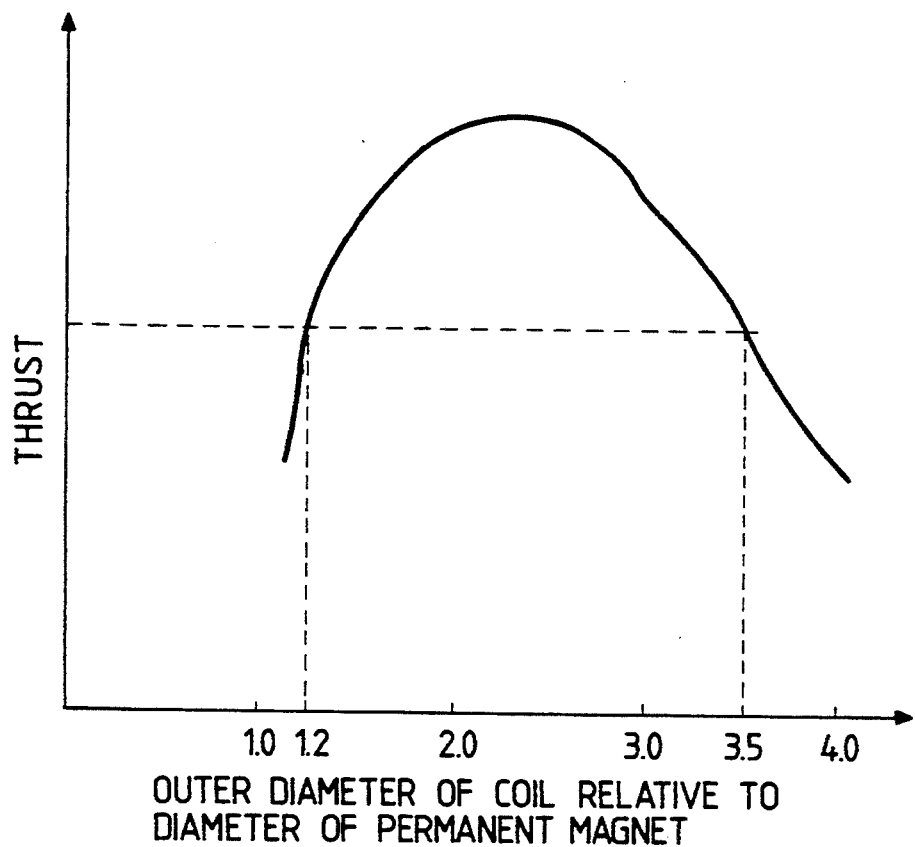
FIG. 32 is a graph showing a relationship between an outer diameter of permanent magnets and an outer diameter of coils.

FIGS. 11 and 12 show a first embodiment of the invention. In FIGS. 11 and 12, reference numeral 1 designates a sleeve-like magnetic substance. Three coils 2A, 2B, 2C are disposed inside the sleeve-like substance 1 and are secured to the sleeve-like substance 1 by a nonmagnetic member such as a resin that constitutes a nonmagnetic guide sleeve 4 for slidably guiding a magnet moving body 3. The magnet moving body 3 includes: two cylindrical rare-earth permanent magnets 5A, 5B arranged with the same poles thereof confronting each other; and a cylindrical magnetic substance 6 that is secured between these permanent magnets 5A, 5B. These permanent magnets 5A, 5B and the cylindrical magnetic substance 6 are unified with one another by an adhesive or the like. The three coils 2A, 2B, 2C are connected so that current flows in directions different from one another with a zone between the magnetic poles of the permanent magnets 5A, 5B as a boundary. That is, the coil 2B in the middle is arranged so as to enclose both the cylindrical magnetic substance 6 and the end portions of the permanent magnets 5A, 5B including the N-poles; and the coils 2A, 2C on both ends, to enclose the end portions of the permanent magnets 5A, 5B including the S-poles, respectively. The direction of the current flowing through the coil 2B in the middle opposes the direction of the current flowing through the coils 2A, 2C on both ends (see N and S indicated in each coil in FIG. 11). According to the present invention, rare-earth permanent magnet whose maximum energy product (BH-max) of 18 MGOe (=140 KJ/m$^3$) or more is used for the cylindrical permanent magnets 5A, 5B in order to obtain sufficient thrust. Thickness of the intermediate magnetic substance 6 disposed between the permanent magnets 5A, 5B is set 0.1 to 1.0 times of the length of the permanent magnets. As reason of this, if the thickness of the intermediate magnetic substance 6 is too thin, a repulsive force becomes strong so that it is difficult to manufacture the magnet moving body, whereas if the thickness of the intermediate magnetic substance 6 is too thick, it is causes a problem in a movement of the magnet moving body in high frequency. Additionally, with respect to a diameter of the coil, a high thrust is obtained when an outer diameter of the coil is selected in a range of 1.2 to 3.5 times of a diameter of the permanent magnet, as shown in FIG. 32. A pin 9 or the like can be attached to the outer end surface of the permanent magnet 5A or 5B as indicated by a phantom line in FIG. 1. The pin serves as transmitting a thrust to an external destination as necessary. If this embodiment is used as a vibrator for pocket bells, no pin 9 is required.

In the first embodiment, the sleeve-like magnetic substance 1 is arranged on the outer circumference of the respective coils 2A, 2B, 2C. A vertical component of the surface magnetic flux density of the magnet moving body 3 is analyzed.

Figure 13A:
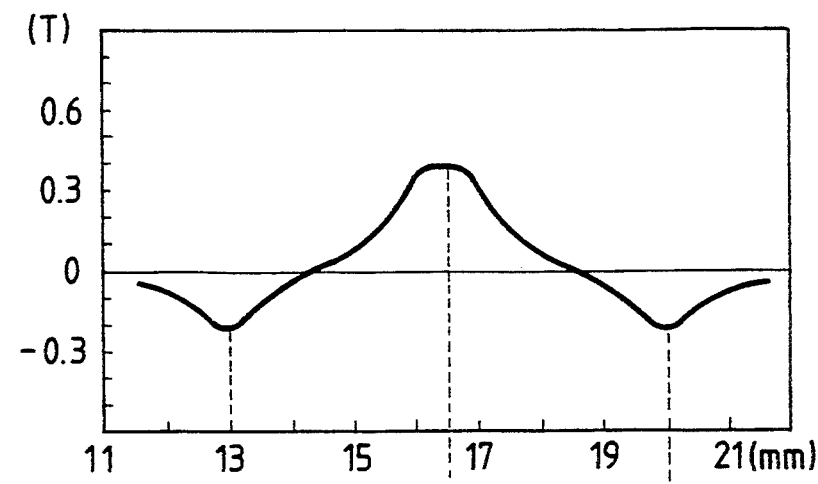
FIG. 13 is a graph showing the vertical component of the surface magnetic flux density on the longitudinal side surface in the case where two permanent magnets are arranged with the same poles thereof confronting each other through a magnetic substance and where a sleeve-like magnetic substance is also arranged.
Figure 13B:
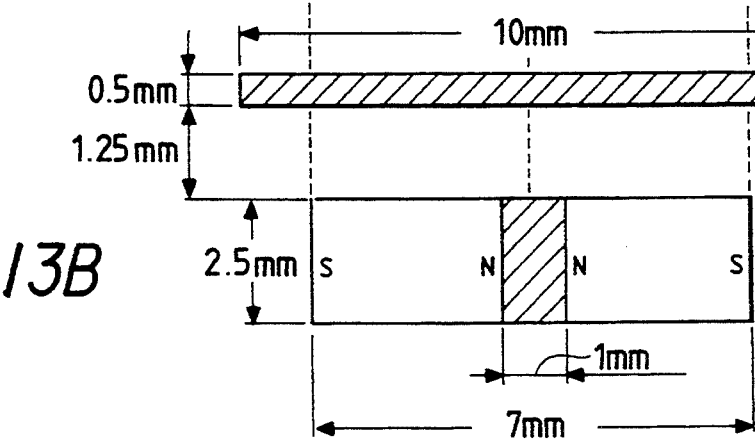

FIG. 13 shows a result obtained from a magnetic field analysis of the vertical component of the surface magnetic flux density made along the longitudinal side surface of two permanent magnets in a case where the two permanent magnets are arranged so that the same poles thereof confront each other while interposing a 1 mm-long magnetic substance therebetween and arranging a sleeve-like magnetic substance facing against the outer circumference of the two permanent magnets. Each of the permanent magnets used was a rare-earth permanent magnet whose diameter was 2.5 mm and whose length was 3 mm. The sleeve-like magnetic substance enclosed the permanent magnets and was 0.5 mm thick and 10 mm long. The sleeve-like magnetic substance was positioned 1.25 mm away from the outer circumference of the permanent magnets. Measurements were made at positions 0.25 to 0.45 mm distant from the surface of the permanent magnets.

In the first embodiment, since the sleeve-like magnetic substance 1 is arranged on the outer circumference of the respective coils 2A, 2B, 2C, the vertical component of the surface magnetic flux density of the magnet moving body 3 further increases as shown in FIG. 13. Such an increase allows the magnetic flux component perpendicular to the longitudinal direction of the magnet moving body 3 to increase, such component contributing to producing a thrust based on the Fieming's left hand rule. Therefore, if current is applied to the three coils 2A, 2B, 2C that are wound annularly around the outer circumference of the magnet moving body 3 so that a magnetic field of opposite polarity is generated alternately, then a larger thrust can be produced. For example, a thrust F4 of 8.0 (gf) was produced when the same power consumption was achieved under the condition that a current of 40 mA was applied to three coils 2A, 2B, 2C while using a magnet moving body formed by interposing a 1 mm-long magnetic substance interposed between two rare-earth permanent magnets as the magnet moving body 3. The coils 2A, 2B, 2C were prepared so that the power consumption became the same as in the first and second conventional examples shown in FIGS. 1 and 2. Each of the two permanent magnets was 2.5 mm in diameter and 3 mm in length (the performance of the rare-earth permanent magnet was the same as the one used in the first conventional example). The direction of the thrust F4 is such that the magnet moving body 3 moves rightward under the polarity shown in FIG. 11. By inverting the current to be applied to each coil, the direction of the thrust produced by the magnet moving body 3 is inverted. When alternating current is applied, the embodiment functions as a vibrator that repeats vibrating at a predetermined cycle is applicable with applicable to a pocket-bell device.

Figure 10:
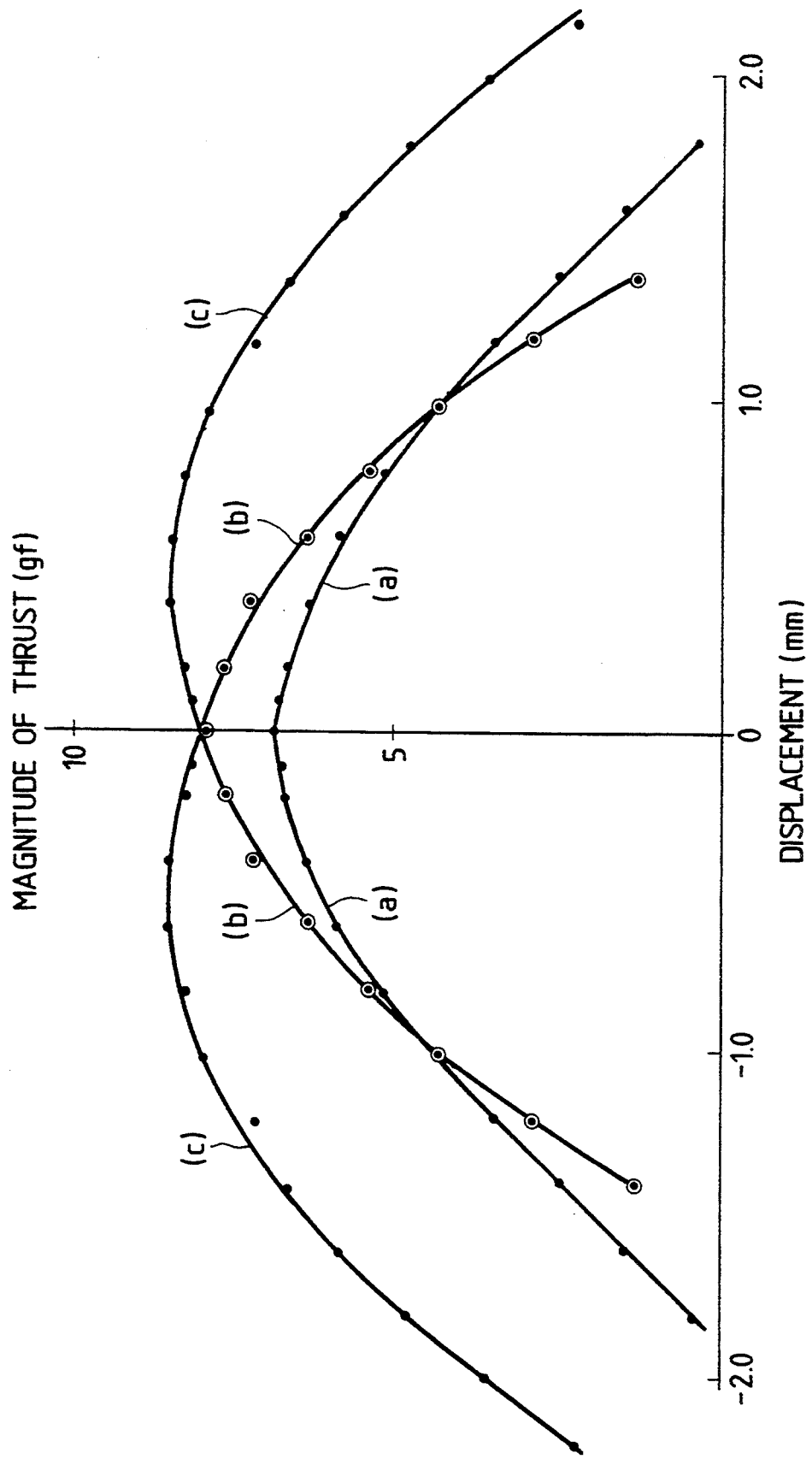
FIG. 10 is a graph showing relationships between displacements and thrusts of magnet moving bodies in the moving magnet-type actuators of the present invention.

A curve (b) of FIG. 10 shows a relationship between the axial displacement and the thrust (gf) of the magnet moving body 3 in the case of the first embodiment (the dimensions and arrangement of the permanent magnets and the sleeve-like magnetic substance as well as the characteristics of the permanent magnets are as shown in FIG. 13). The relationship refers to a movement of the magnet moving body 3 in the direction of leaving the zero displacement point. A curve (c) shows a relationship between the axial displacement and the thrust (gf) of the magnet moving body 3 in the case of the sleeve-like magnetic substance is provided in the first embodiment. The relationship refers to a movement of the magnet moving body 3 in the direction of nearing the zero displacement point. However, the zero displacement was defined as a state in which the midpoint of the magnet moving body 3 coincides with the midpoint of the coil 2B in the middle, and the current flowing in each coil was 40 mA. Accordingly, the reason why the thrusts are different depending on the magnet moving body 3 moving closer to the zero displacement point or moving away from the zero displacement point is that magnet attracting force acts between the magnetic poles of the permanent magnets of the magnet moving body 3 and the sleeve-like magnetic substance 1 so that the magnet moving body 3 returns to the zero displacement point.

Figure 14:
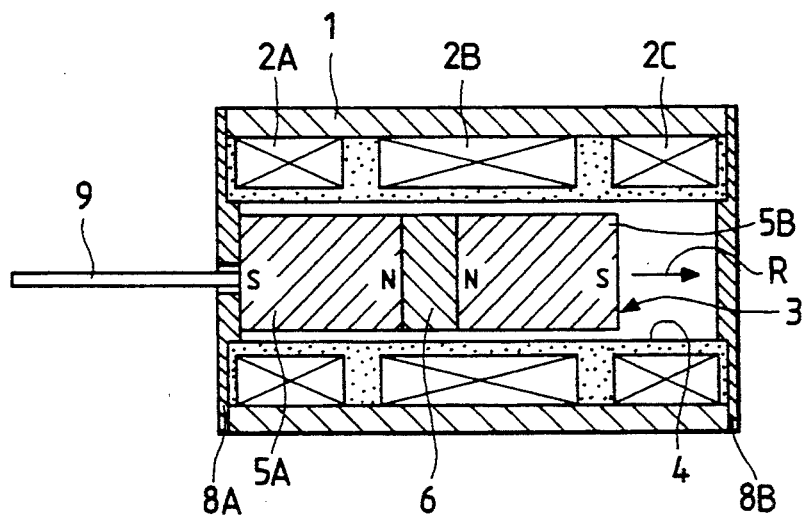
FIG. 14 is a front sectional view showing a second embodiment of the invention.

FIG. 14 shows a second embodiment of the invention. In the second embodiment, attracting plates 8A, 8B made of a magnetic substance are fitted into and secured to both ends of a sleeve-like magnetic substance 1 and of a nonmagnetic guide sleeve 4. A pin 9 secured to an outer end surface of a permanent magnet 5A projects from a hole provided on one attracting plate 8A. Other structural aspects of the second embodiment are the same as those of the first embodiment.

In the case of the second embodiment, the permanent magnet is attracted by either one of the magnetic attracting plates 8A, 8B when the coils 2A, 2B, 2C are not in conduction. If a thrust is produced in the direction of an arrow R by energizing the coils 2A, 2B, 2C so that a magnetic field of opposite polarity is generated alternately in each of the coils 2A, 2B, 2C with the magnet moving body 3 staying at a position shown in FIG. 3, then the magnet moving body 3 moves in the direction of the arrow R by leaving the attracting plate 8A and stops while attracted by the attracting plate 8B. If, on the other hand, a thrust whose direction is opposite to that of the arrow R is produced by inverting the current in each of the coils 2A, 2B, 2C, then the magnet moving body 3 leaves the attracting plate 8B, moves toward the attracting plate 8A, and stops while attracted by this attracting plate 8A. Thus, the attracting plates 8A, 8B contribute to regulating the range of movement of the magnet moving body 3 accurately.

Further, while the attracting plates 8A, 8B made of a magnetic substance are arranged on both sides of the sleeve-like magnetic substance 1 and the nonmagnetic guide sleeve 4 in the second embodiment, such a structure that the attracting plate is arranged only on one side of the sleeve-like magnetic substance 1 and the nonmagnetic guide sleeve 4 may also be applicable.

Figure 15:
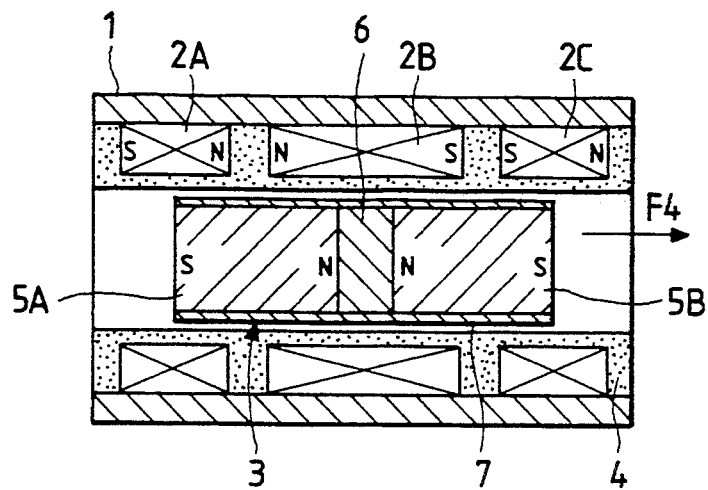
FIG. 15 is a front sectional view showing a moving magnet-type actuator of a third embodiment of the invention.
Figure 16:
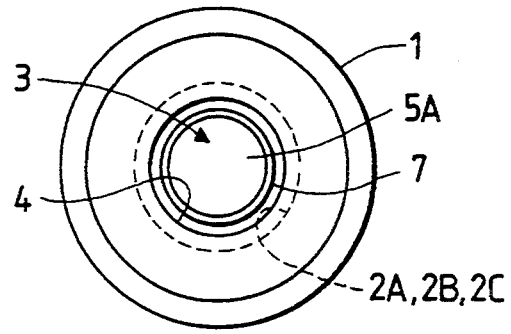
FIG. 16 is a side view of the moving magnet-type actuator shown in FIG. 15.

FIGS. 15 and 16 show a third embodiment of the present invention. In third embodiment, the magnet moving body 3 includes: two cylindrical rare-earth permanent magnets 5A, 5B arranged with the same poles thereof confronting each other; a cylindrical magnetic substance 6 that is secured between these permanent magnets 5A, 5B and a nonmagnetic sleeve-like holder 7. These permanent magnets 5A, 5B and the magnetic substance 6 are accommodated in the nonmagnetic sleeve-like holder 7 and unified with one another by an adhesive or the like. Other structures are the same as the above mentioned first embodiment.

In third embodiment, the permanent magnets 5A, 5B and the intermediate magnetic substance 6 are accommodated and fixed in the nonmagnetic sleeve-like holder 7. This configuration prevents the permanent magnets from being separated from each other due to repulsive force derived from the same poles thereof that confront each other, thus contributing to making the structure of the magnet moving body 3 rigid and improving the reliability thereof while preventing breakage or wear of the permanent magnets. Assembling accuracy can also be improved.

Figure 17:
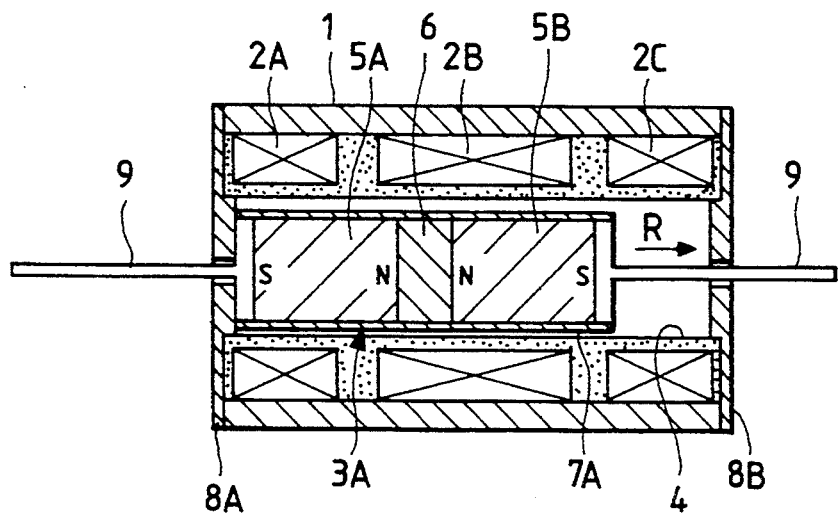
FIG. 17 is a front sectional view showing a fourth embodiment of the invention.

FIG. 17 shows a fourth embodiment of the invention. In this case, a magnet moving body 3A includes: two cylindrical rare-earth permanent magnets 5A, 5B arranged with the same poles thereof confronting each other; a cylindrical magnetic substance 6 interposed between these permanent magnets 5A, 5B; nonmagnetic members 9, each having a pin, arranged on the outer end surfaces of the respective permanent magnets; and a nonmagnetic sleeve-like holder 7A. The permanent magnets 5A, 5B, the magnetic substance 6, and the disc-like bases of the members 9 with pins are accommodated in the nonmagnetic sleeve-like holder 7A and fixed therein by an adhesive or the like. Further, attracting plates 8A, 8B are fitted into and secured to both end portions of a sleeve-like magnetic substance 1 made of a magnetic substance and a nonmagnetic guide sleeve 4. The pin portions of the members 9 secured to the outer end surfaces of the permanent magnets 5A, 5B project from holes provided on the attracting plates 8A, 8B. The pin portions of the members 9 are slidable through the holes of the attracting plates 8A, 8B. Other structural aspects of the fourth embodiment is the same as those of the first embodiment.

In the case of the fourth embodiment, the magnet moving body 3A is attracted by either one of the magnetic attracting plates 8A, 8B when the coils 2A, 2B, 2C are not in conduction. If the magnet moving body 3A is in a shown condition, a thrust is produced in the direction of an arrow R by energizing the coils 2A, 2B, 2C so that a magnetic field of opposite polarity can be generated alternately. As a result, the magnet moving body 3A leaves the attracting plate 8A, moves in the direction of the arrow R, and stops while attracted by the attracting plate 8B. If, on the other hand, a thrust is produced in the direction opposite to the arrow R by inverting the current to be applied to the coils 2A, 2B, 2C, then the magnet moving body 3A leaves the attracting plate 8B, moves toward the attracting plate 8A, and stops while attracted by the attracting plate 8A. Accordingly, the presence of the attracting plates 8A, 8B contributes to accurately regulating the range of movement of the magnet moving body 3A, thereby allowing the movement of the magnet moving body 3A to be transmitted to an external destination through the members 9 with pins.

Figure 18:
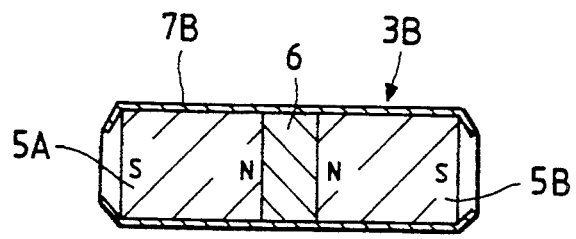
FIG. 18 is a front sectional view showing a modified example of the magnet moving body applicable to the third embodiment.

FIG. 18 shows a modified example of the magnet moving body applicable to the third embodiment. A magnet moving body 3B of this example includes: two cylindrical rare-earth permanent magnets 5A, 5B; a cylindrical magnetic substance 6 interposed between these permanent magnets 5A, 5B; and a nonmagnetic sleeve-like holder 7B. The permanent magnets 5A, 5B and the magnetic substance 6 are accommodated in the sleeve-like holder 7B. These components constituting the magnet moving body are fixed and integrated with one another by caulking the end portions of the sleeve-like holder 7B. According to this structure, the rate of production of magnet moving bodies can be improved.

The magnet moving body formed by accommodating the permanent magnets 5A, 5B, the magnetic substance 6, and the disc-like bases of the members 9 with pins, and fixing and integrating these components by caulking the end portions of the sleeve-like holder may be used also in the fourth embodiment.

Still further, while the magnetic attracting plates 8A, 8B are arranged on both ends of the sleeve-like magnetic substance 1 and the nonmagnetic guide sleeve 4 and the members 9 with pins are provided on the outer end surfaces of the both permanent magnets 5A, 5B in the fourth embodiment, such a structure that the attracting plate and the member with a pin are provided only on one side of the magnet moving body may also be applied.

Figure 19:
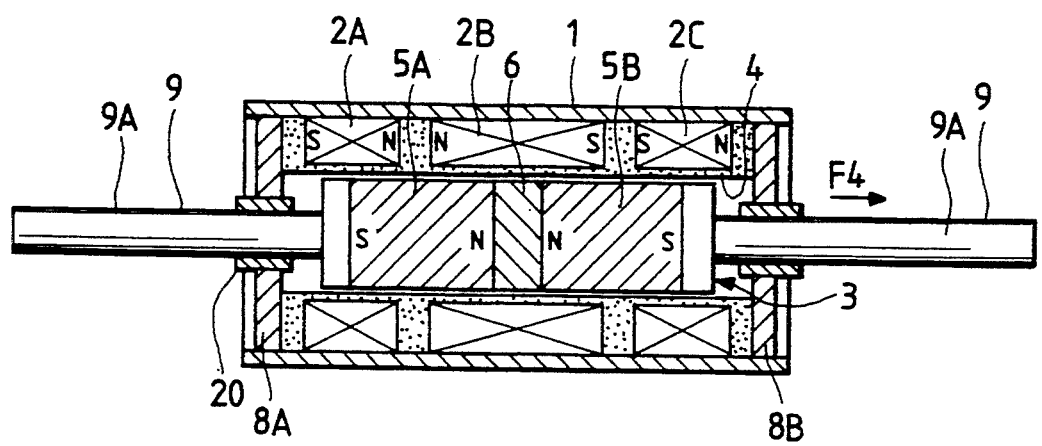
FIG. 19 is a front sectional view showing a moving magnet-type actuator a fifth embodiment of the invention.
Figure 20:
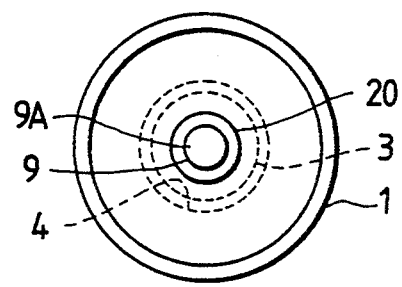
FIG. 20 is a side view of the moving magnet-type actuator shown in FIG. 19.

FIGS. 19 and 20 show a fifth embodiment of the present invention. In the fifth embodiment, the magnet moving body 3 includes: two cylindrical rare-earth permanent magnets 5A, 5B arranged with the same poles thereof confronting each other; a cylindrical magnetic substance 6 that is secured between these permanent magnets 5A, 5B, and an output extracting pin 9 fixed on outer end surface of the permanent magnets 5A, 5B. These permanent magnets 5A, 5B, the magnetic substance 6, and the output extracting pin are integrated with one another by an adhesive or the like. The output extracting pin 9 may be either magnetic or nonmagnetic.

Further, side plates 8A, 8B made of a nonmagnetic substance are fitted into and secured to both ends of the sleeve-like magnetic 1 and the nonmagnetic guide sleeve 4. Sleeve-like bearing members 20 made of a metal such as brass, or a highly slidable resin, etc. are supported in the middle of the side plates 8A, 8B, respectively. The pin portions 9A of the members 9 with pins which are secured to the outer end surfaces of the permanent magnets 5A, 5B are slidably supported by the inner surfaces of the sleeve-like bearing members 20, with the pin portions 9A projecting from the bearing members. The other structures are the same as the above mentioned first embodiment.

In the fifth embodiment, the members 9 with pins integrated with the magnet moving body 3 are slidably supported by the bearing members 20. This configuration can regulate the magnet moving body 3 so as to be concentric with the central axis of the nonmagnetic guide sleeve 4 at all times, thus preventing unnecessary play of the magnet moving body 3 as well as the members 9 with pins. In addition, the magnet moving body 3 is not brought into contact with the inner circumferential surface of the magnetic guide sleeve 4, so that the magnet moving body 3 can move smoothly in the axial direction, which in turn eliminates, e.g., wear of the magnet moving body 3 and the nonmagnetic guide sleeve 4.

Figure 21:
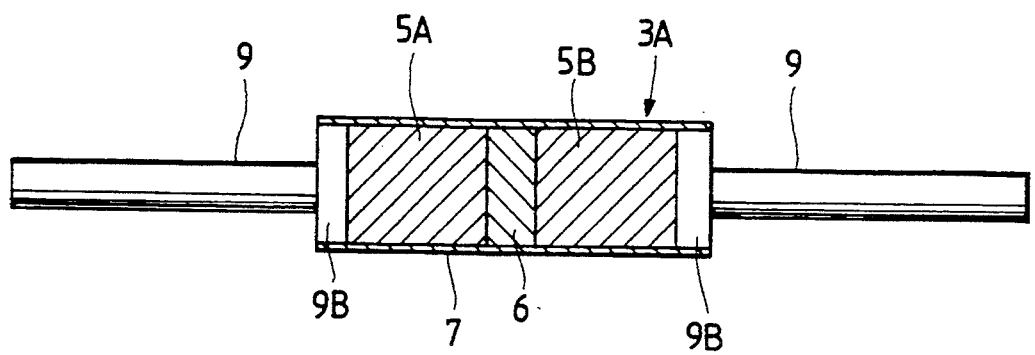
FIG. 21 is a front sectional view showing a modified example of the magnet moving body applicable to the fifth embodiment.

FIG. 21 shows a modified example of the magnet moving body used in the fifth embodiment. In this case, a magnet moving body 3A is formed by interposing a cylindrical magnetic substance 6 between two permanent magnets 5A, 5B with the same poles of the permanent magnets confronting each other, accommodating these components in a nonmagnetic sleeve-like holder 7, arranging members 9 with output extracting pins on outer end surfaces of the permanent magnets 5A, 5B, and fixing disc-like bases 9B of such members 9 with pins on both end portions of the sleeve-like holder 7. The permanent magnets 5A, 5B, the cylindrical magnetic substance 6, and the members 9 with pins may be fixed on the sleeve-like holder 7 by an adhesive or the like, or by caulking the end portions of the sleeve-like holder 7.

In the above-described embodiment, the side plates 8A, 8B may be made of a magnetic material so that the side plates can function as the attracting plates. In this case, the magnet moving body 3 is attracted by either one of the magnetic side plates 8A, 8B when the coils 2A, 2B, 2C are not in conduction. If a thrust is produced at the coils 2A, 2B, 2C in the direction of the magnet moving body 3 leaving the side plate by which the magnet moving body 3 is attracted, then the magnet moving body 3 moves toward the opposite side plate and stops while attracted by such opposite side plate.

While the magnet moving body 3 including two permanent magnets arranged with the same poles thereof confronting each other and the magnetic substance interposed therebetween has been exemplified in the above-described embodiments, a magnet moving body such as including three or more permanent magnets with the same poles thereof confronting each other and magnetic substances interposed therebetween may be applicable. In this case, the number of coils can be increased to four or more to match the increase in the number of permanent magnets.

Still further, while the magnet moving body 3 is provided with the members with pins on both sides thereof, the member 9 with a pin may be arranged only on one side thereof. In this case, the bearing member is provided only on one side (the length of the bearing member 20 is preferably longer in this case).

Figure 22A:
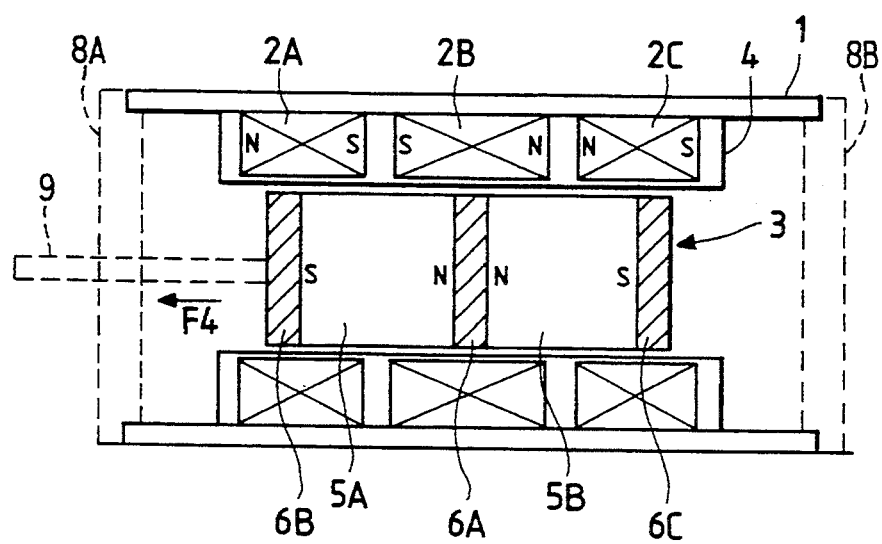
FIG. 22A is a front sectional view showing a moving magnet-type actuator of a sixth embodiment of the invention.
Figure 22B:
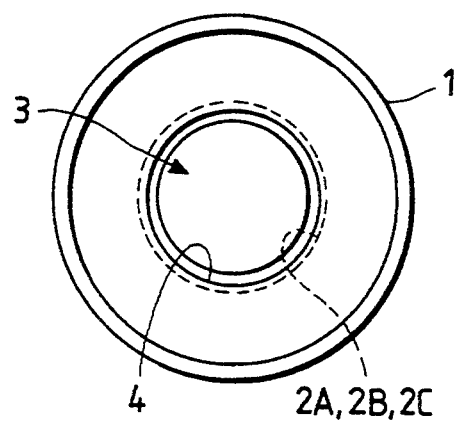
FIG. 22B is a side view of the moving magnet-type actuator shown in FIG. 22A.

FIGS. 22A and 22B show a sixth embodiment of the present invention. In this embodiment, the magnet moving body 3 includes: two cylindrical rare-earth permanent magnets 5A, 5B arranged with the same poles thereof confronting each other; a cylindrical intermediate magnetic substance 6A that is secured between these permanent magnets 5A, 5B; and cylindrical outer end magnetic substances 6B, 6C secured to the outer end surfaces of the permanent magnets 5A, 5B. These permanent magnets 5A, 5B and the magnetic substances 6A, 6B, 6C are integrated with one another by an adhesive or the like. In this embodiment, a thickness of the outer end magnetic substances are designed about half to same ($\frac{1}{2}$ to 1) of that of the intermediate magnetic substance 6A. The other structures are the same as the above mentioned first embodiment.

FIG. 23 shows a result obtained from a magnetic field analysis of the vertical component of the surface magnetic flux density made along the longitudinal side surface of two permanent magnets when the two permanent magnets were arranged so that the same poles thereof confront each other while interposing the magnetic substance between the permanent magnets and disposing magnetic substances on outer end surfaces of the permanent magnets.

The structure of the magnet moving body 3 in FIG. 23 is such that the two permanent magnets are arranged so that the same poles thereof confront each other; the intermediate magnetic substance is interposed between the permanent magnets; and the outer end magnetic substances are arranged on the outer end surfaces of the permanent magnets as shown in FIG. 23. The vertical component of the surface magnetic flux density in an area corresponding to the positions of the outer end magnetic substances in the case of FIG. 23 is better than in the case of FIG. 8 in which no outer end magnetic substances are used (it goes without saying that the vertical component of the surface magnetic flux density is better than in the case of FIG. 3 in which only one permanent magnet is used.)

As described above, the magnetic moving body 3 formed by arranging the two permanent magnets 5A, 5B with the same poles thereof confronting each other, interposing the intermediate magnetic substance 6A between the permanent magnets 5A, 5B, and arranging the outer end magnetic substances 6B, 6C on the outer end surfaces of the permanent magnets 5A, 5B can further increase the magnetic flux component perpendicular to the longitudinal direction of the magnet moving body 3, such magnetic flux component contributing to producing a thrust based on the Fleming's left hand rule. In addition, since the three coils 2A, 2B, 2C cut across the magnetic flux from all the magnetic poles of the permanent magnets effectively, a large thrust can be produced by applying current to the three coils 2A, 2B, 2C in such a manner that a magnetic field of opposite polarity is generated alternately. Such thrust can never be produced by the conventional example of FIG. 1, and will be larger than the thrust produced by the first embodiment shown in FIG. 11.

Two rare-earth permanent magnets which is 2.5 mm in diameter and 3 mm in length (the performance of the rare-earth permanent magnet was the same as the one used in the first conventional example), an intermediate magnetic substance which is 1 mm in length and is interposed between the permanent magnets, and outer end magnetic substances disposed on the outer end surface of the permanent magnets are used to form a magnet moving body 3. Additionally, a sleeve-like magnetic substance 1 are provided at outercircumstance of the three coils. By this arrangement of the actuator, when 40 mA current is applied into the tree coils 2A, 2B, 2C so as to be the same power consumption as in the first conventional example, then a force F4 of 8.6 (gf) is generated. Comparison of embodiments and the conventional example is shown in the following table.

|  | Sleeve magnetic substance | No sleeve magnetic substance |
| --- | --- | --- |
| First conventional example; (Single magnet & 2 coils; FIG. 1) | 5.4 gf | 4.7 gf |
| First Embodiment; (2 magnets & intermediate magnetic substance & 3 coils); FIG. 11) | 8.0 gf | 6.7 gf |
| Sixth Embodiment; (2 magnets & intermediate magnetic substance & 2 outer end magnetic substance & 3 coils) | 8.6 gf | 7.3 gf |

An output extracting pin 9 may be arranged on the outer end magnetic substance 6B or 6C as shown by a phantom line of FIG. 22A so that the thrust can be transmitted to an external destination. In the case where the embodiment is used as a vibrator for a pocket bell or the like, no pin 9 is required.

A magnetic attracting plate or plates 8A, 8B may be fixed on either one or both end portions of the sleeve-like magnetic substance 1 as shown by a phantom line of FIG. 22a so that the range of movement of the magnet moving body 3 can be regulated. In this case, the magnet moving body 3 stops while attracted by the magnetic attracting plates 8A, 8B.

FIG. 24 shows a seventh embodiment of the invention. In FIG. 24, a magnet moving body 3 accommodates two cylindrical rare-earth permanent magnets 5A, 5B, a cylindrical intermediate magnetic substance 6A interposed between these permanent magnets 5A, 5B, and cylindrical outer end magnetic substances 6B, 6C arranged on outer end surfaces of the permanent magnets 5A, 5B in a nonmagnetic sleeve-like holder 7. These components are integrated with one another by caulking the end portions of the holder 7, by being bonded to the holder 7, or like means. Nonmagnetic pins 25 are integrally formed on the outer end magnetic substances 6B, 6C of the magnet moving body 3. That is, the nonmagnetic pins 25 are firmly integrated with the flat cylindrical outer end magnetic substances 6B, 6C in the middle thereof by welding, bonding, or like means. On the other hand, support plates 28 are secured to both end portions of a sleeve-like magnetic substance 1 and a nonmagnetic guide sleeve 4. The nonmagnetic pins 25 pass through central holes of the support plates 28. Both nonmagnetic pins 25 are slidably supported by the central holes 26. Annular permanent magnets 27 are fixed on the inner surfaces of the support plates 28, respectively, so that repulsive force can be produced between the magnetic poles of the annular permanent magnets 28 and the magnetic poles on the outer end surfaces of the permanent magnets 5A, 5B. For example, in FIG. 24, the S-poles of the outer end surfaces of the permanent magnets 5A, 5B confront the S-poles of the annular permanent magnets 27. Other configurational aspects of the this embodiment are the same as those of the sixth embodiment.

According to the seventh embodiment, the magnet moving body 3 is positioned to the middle of the sleeve-like magnetic substance 1 because of the repulsive force derived from the permanent magnets 5A, 5B and the annular permanent magnets 27 on right and left when the coils 2A, 2B, 2C are not energized. By applying direct current to the coils 2A, 2B, 2C, the magnet moving body 23 is driven to one side. When alternating current is applied to the coils, the magnet moving body 23 functions as a vibrator by the reciprocating operation thereof. However, when having made a certain displacement, the magnet moving body 3 is made to return to the middle position by the repulsive force derived from the permanent magnets 5A, 5B and the annular permanent magnets 27 on right and left. As a result, noise due to collision of the magnet moving body 3 against the support plates 28 and the annular permanent magnets 27 can be prevented. Further, since the permanent magnets 5A, 5B and the magnetic substances 6A, 6B, 6C are accommodated integrally in the holder 7, the reliable integration of these components, the improvement of durability, and the increase in service life can be achieved.

Figure 25:
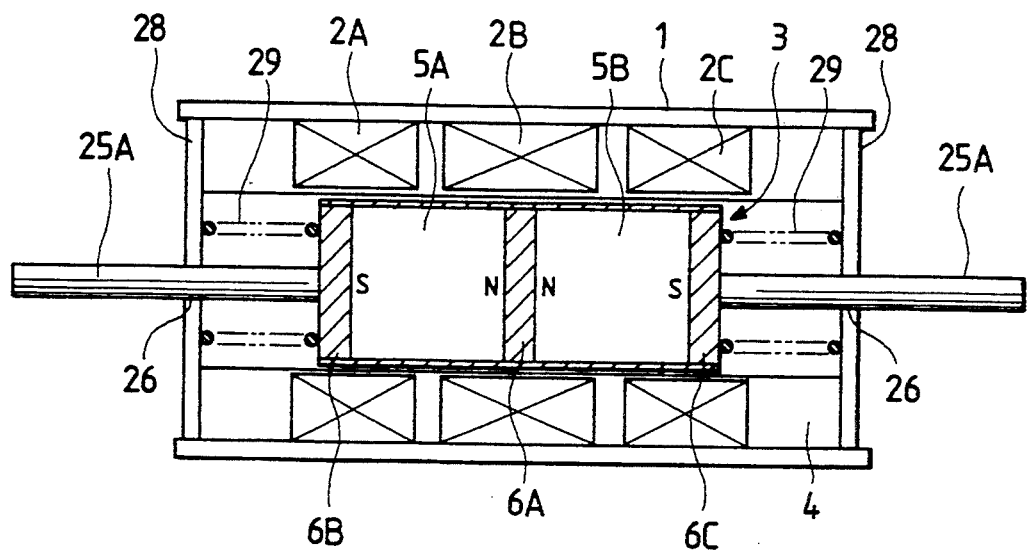
FIG. 25 is a front sectional view showing an eighth embodiment of the invention.

FIG. 25 shows an eighth embodiment of the invention. In FIG. 25, the outer end magnetic substances 6B, 6C of the magnet moving body 3 are provided with pins (the pines may be made of either a nonmagnetic or magnetic substance) 25A so as to be integral with one another. That is, the pins 25A are secured to and integrated with the central portions of the outer end magnetic substances 6B, 6C by welding, bonding, or like means, or unitized with the outer end magnetic substances themselves. On the other hand, support plates 28 are secured to both end portions of a sleeve-like magnetic substance 1 and a nonmagnetic guide sleeve 4, and the pins 25A pass through central holes 26 of the support plates 28. Both pins 25A are slidably supported by the central holes 26. Compression springs 29 are interposed between the outer end magnetic substances 6B, 6C and the inner surfaces of the support plates 28, respectively. Other configurational aspects of this embodiment are the same as those of the seventh embodiment.

According to the eighth embodiment, the magnet moving body 3 is returned to the middle position of the sleeve-like magnetic substance 1 by the resilient force of the compression spring 29 on right and left when the coils 2A, 2B, 2C are not energized, whereas the magnet moving body 3 is driven to one side by applying direct current to the coils 2A, 2B, 2C. When alternating current is applied to the coils, the magnet moving body 3 functions as a vibrator by the reciprocating operation thereof. However, when having made a certain displacement, the magnet moving body 3 is made to return to the middle position by the resilient force of the compression springs 29. As a result, noise due to collision of the magnet moving body 3 against the support plates 28 can be prevented.

Figure 26:
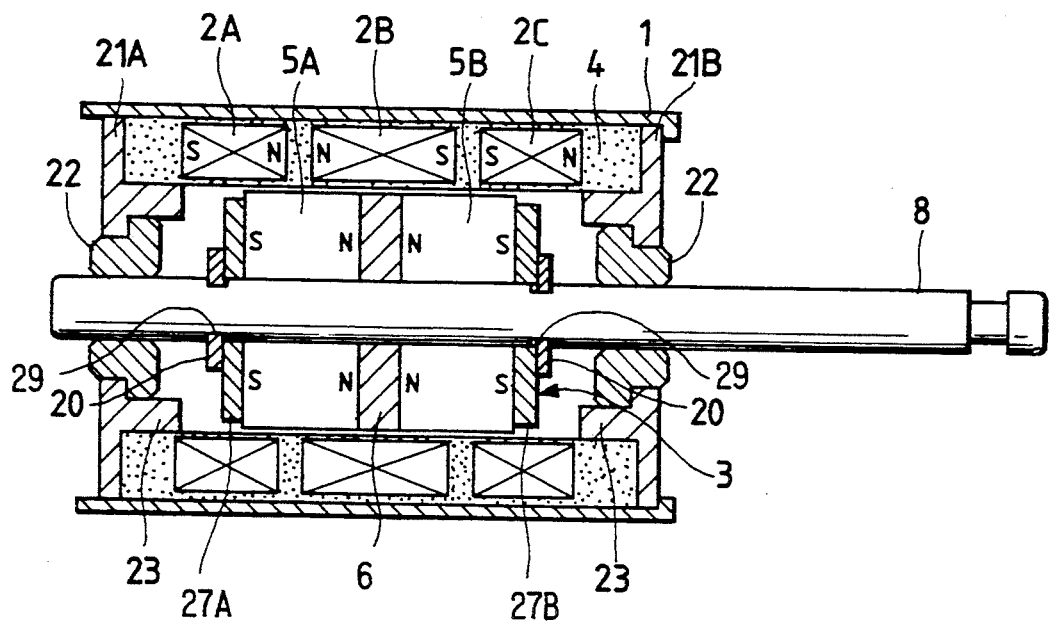
FIG. 26 is a front sectional view showing a moving magnet-type actuator of a ninth embodiment of the invention.
Figure 27:
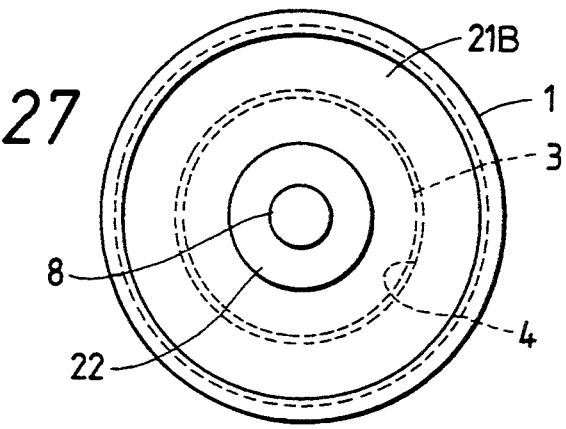
FIG. 27 is a side view of the moving magnet-type actuator shown in FIG. 26.

FIGS. 26 and 27 show a ninth embodiment. In these Figures, reference numeral 1 designates a sleeve-like magnetic substance. Three coils 2A, 2B, 2C are arranged inside the sleeve-like magnetic substance 1 and are secured to the sleeve-like substance 1 by a nonmagnetic member such as an insulating resin that constitutes a nonmagnetic guide sleeve 4 for slidably guiding a magnet moving body 3. The inner surface of the nonmagnetic guide sleeve 4 forms an inner circumferential surface.

The magnet moving body 3 includes: two hollow cylindrical rare-earth permanent magnets 5A, 5B arranged with the same poles thereof confronting each other; a hollow cylindrical intermediate magnetic substance 6 interposed between these permanent magnets 5A, 5B; and hollow disc-like cushion plates 27A, 27B arranged on the outer end surfaces of the permanent magnets 5A, 5B with a through shaft body 8 made of a metal being inserted therethrough. The through shaft body 8 is held by causing clampers (E rings made of a metal) 20 to be fitted into fitting grooves 29 of the through shaft body 8, so that the permanent magnets 5A, 5B, the intermediate magnetic substance 6, and the disc-like cushion plates 27A, 27B are fixed on the metallic through shaft body 8. The through shaft body 8 is made of either a nonmagnetic or magnetic metal. The cushion plates 27A, 27B are made of an elastic material such as silicon rubber, and are interposed between a pair of clampers 20 while compressed slightly. As a result, the cushion plates 27A, 27B can absorb variations in the thickness of the respective permanent magnets 5A, 5B and the magnetic substance 6, thereby preventing play of these components. An adhesive may additionally be used to integrate the metallic through shaft body 8 with the permanent magnets 5A, 5B and the magnetic substance 6.

The three coils 2A, 2B, 2C are connected so that current flows in different directions with a zone between the magnetic poles of the permanent magnets 5A, 5B as a boundary. That is, the coil 2B in the middle is wound annularly so that both the magnetic substance 6 and the end portions of the permanent magnets 5A, 5B including the N-poles are enclosed; whereas the coils 2A, 2C on both ends are wound annularly so that the end portions of the permanent magnets 5A, 5B including the S-poles are enclosed. The direction of the current flowing through the coil 2B in the middle opposes the direction of current flowing through the coils 2A, 2C on both ends (see N and S indicated in each coil in FIG. 26).

Further, side plates 21A, 21B made of a nonmagnetic substance are fitted into and secured to both ends of the sleeve-like magnetic substance 1 and the nonmagnetic guide sleeve 4. Sleeve-like bearing members 22 made of a sintered metal, a highly slidable resin or the like are supported in the middle of the side plates 21A, 21B, respectively. The through shaft body 8 passing through and integrated with the permanent magnets 5A, 5B and the magnetic substance 6 is slidably supported by the inner surfaces of the sleeve-like bearing members 22. One end of the through shaft body 8 projects from the bearing member so that such end can be used as an output pin. The side plates 21A, 21B have projecting portions 23 that are fitted into the inner circumferential surfaces of the nonmagnetic guide sleeve 4, so that the front ends of the projecting portions 23 can regulate the range of movement of the magnet moving body 3 while abutting against the cushion plates 27A, 27B when the magnet moving body 3 is moving. The bearing members 22 may be either nonmagnetic or magnetic.

Further, the magnet moving body 3 is formed by inserting the metallic through shaft body 8 into the hollow cylindrical rare-earth permanent magnets 5A, 5B, the hollow cylindrical intermediate magnetic body 6, and the hollow disc-like cushion plates 27A, 27B; and fitting the fasteners 20 into the fitting grooves 29 of the metallic through shaft body 8 for holding. As a result of this configuration, the permanent magnets 5A, 5B and the intermediate magnetic body 6 can be fixed and integrated with one another reliably, which facilitates the assembling work therefor.

Further, the through shaft body 8 integrated with the magnet moving body 3 is slidably supported by the bearing members 22. This configuration can regulate the magnet moving body 3 so as to be concentric with the central axis of the nonmagnetic guide sleeve 4 at all times without allowing the magnet moving body 3 to play. In addition, the gap between the outer circumference of the permanent magnets 5A, 5B and the coils 2A, 2B, 2C can be set to a necessary minimum without having to cover a holder or the like on the outer circumference of the permanent magnets for the integration of the permanent magnets 5A, 5B and the magnetic body 6 thereby contributing to, effectively improving the thrust. Still further, the magnet moving body 3 is not brought into contact with the inner circumferential surface of the nonmagnetic guide sleeve 4, so that the magnet moving body 3 can move smoothly in the axial direction, which in turn eliminates, e.g., wear of the magnet moving body 3 and the nonmagnetic guide sleeve 4.

In the configuration of the ninth embodiment, if either one or both of the side plates 21A. 21B on both outer ends are made of a magnetic substance, then the side plate or plates formed of the magnetic substance can serve as a magnet attracting body that attracts the magnet moving body 3.

If, e.g., both of the side plates 21A, 21B are made of a magnetic substance, then the magnet moving body 3 is attracted and held by either one of the side plates when the coils 2A, 2B, 2C are not energized. If a thrust is produced by the coils 2A, 2B, 2C so that the magnet moving body 3 moves to leave the side plate by which the magnet moving body 3 is attracted, then the magnet moving body 3 moves to the opposite side plate and stops while attracted by such opposite side plate.

Further, if only one of the side plates is made of a magnetic substance, then it can be set so that the magnet moving body 3 is attracted and held by such one of the side plates at all times.

Figure 28:
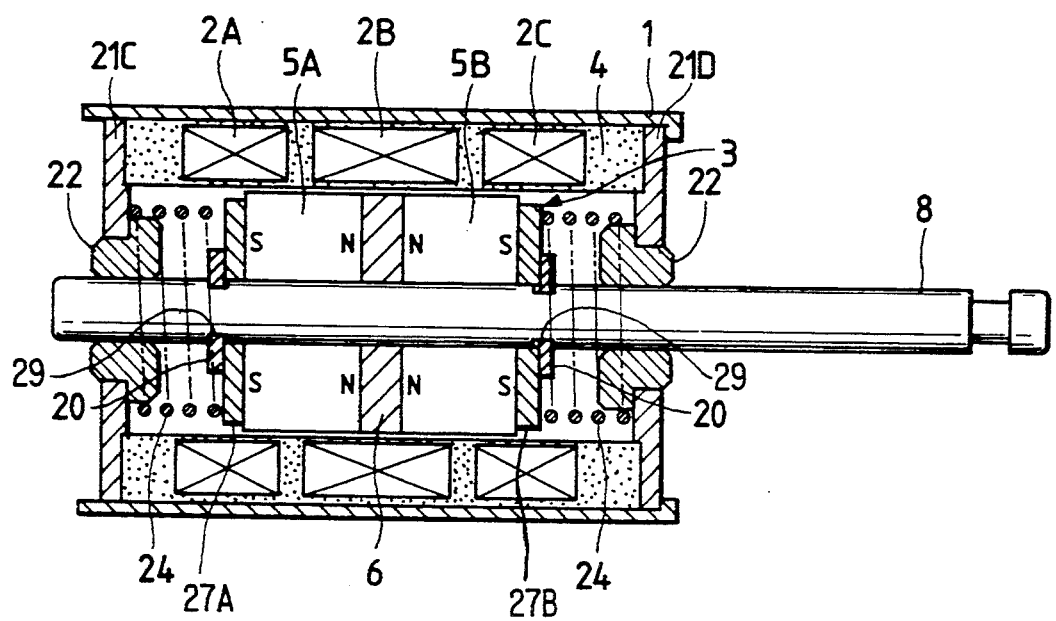
FIG. 28 is a front sectional view showing a tenth embodiment of the invention.

FIG. 28 shows a tenth embodiment of the invention. In FIG. 28, nonmagnetic side plates 21C, 21D are fitted into and secured to both ends of a sleeve-like magnetic substance 1 and of a nonmagnetic guide sleeve 4. Compression springs 24 are arranged between the inner surfaces of the side plates 21C, 21D and the disc-like cushion plates 27A, 27B on the sides of the magnet moving body 3. The compression springs 24 bias the magnet moving body 3 back to the middle position. Other configurational aspects of the tenth embodiment are the same as those of the ninth embodiment.

According to the tenth embodiment, the magnet moving body 3 is returned to the middle position of the sleeve-like magnetic substance 1 because of the resilient force of the compression springs 24 on right and left when the coils 2A, 2B, 2C are not energized. By applying direct current to the coils 2A, 2B, 2C, the magnet moving body 3 is driven to one side. When alternating current is applied to the coils, the magnet moving body 3 functions as a vibrator by the reciprocating operation thereof. However, when having made a certain displacement, the magnet moving body 3 is made to return to the middle position by the resilient force of the compression springs 24. As a result, noise due to collision of the magnet moving body 23 against the side plates 21C, 21D can be prevented.

Figure 29:
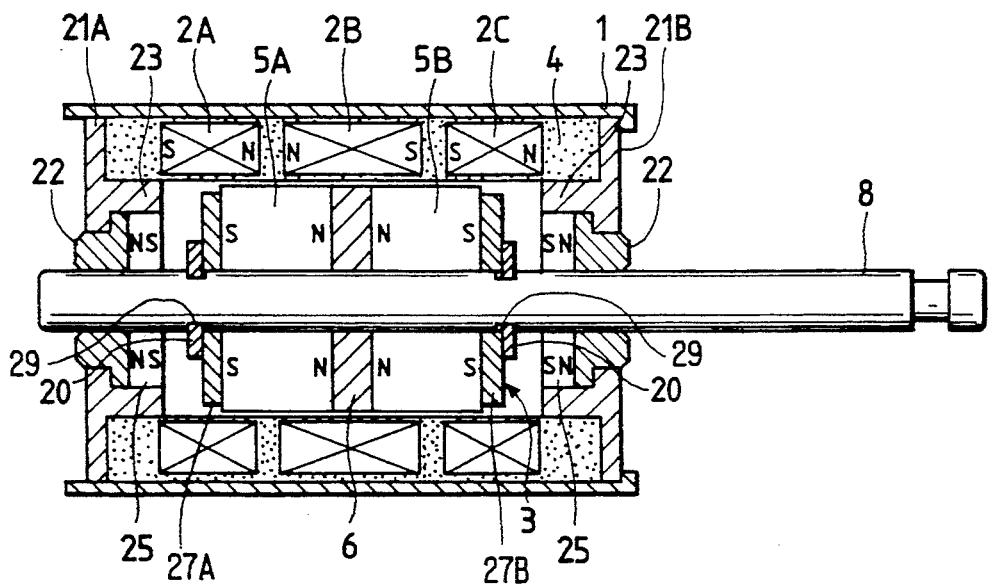
FIG. 29 is a front sectional view showing an eleventh embodiment of the invention.

FIG. 29 shows an eleventh embodiment of the invention. In FIG. 29, nonmagnetic side plates 21A, 21B are fitted into and secured to both ends of a sleeve-like magnetic substance 1 and of a nonmagnetic guide sleeve 4. Annular permanent magnets 25 for returning the magnet moving body 3 are fixed on the inner circumferences of the projecting portions 23 of the side plates 21A, 21B. The through shaft body 8 of the magnet moving body 3 passes through inner circumferential holes of the return annular permanent magnets 25 and the bearing members 22. The return annular permanent magnets 25 have, on the surfaces confronting the magnet moving body 3, magnetic poles that generate repulsive force relative to the magnetic poles on the outer ends of the permanent magnets 5A, 5B of the magnet moving body 3. In FIG. 29, e.g., the S-poles on the outer sides of the permanent magnets 5A, 5B confront the S-poles of the return annular permanent magnets 25. Other configurational aspects of the eleventh embodiment are the same as those of the ninth embodiment.

According to the eleventh embodiment, the magnet moving body 3 is returned to the middle position in the sleeve-like magnetic substance 1 because of the resilient force of the return annular permanent magnets 25 on right and left when the coils 2A, 2B, 2C are not in conduction. By applying direct current to the coils 2A, 2B, 2C, the magnet moving body 3 can be driven to one side. When alternating current is applied to the coils, the magnet moving body 3 functions as a vibrator by the reciprocating operation thereof. However, when having made a certain displacement, the magnet moving body 3 is made to return to the middle position by the resilient force of the return annular permanent magnets 25. As a result, noise due to collision of the magnet moving body 3 against the side plates 21A, 21B and the annular permanent magnets 25 can be prevented.

Figure 30:
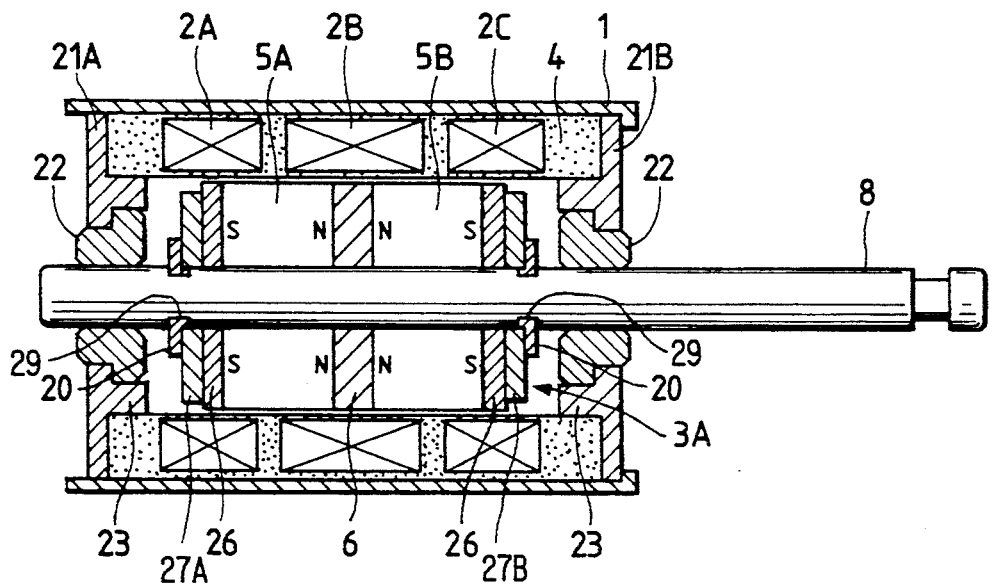
FIG. 30 is a front sectional view showing a twelfth embodiment of the invention.

FIG. 30 shows a twelfth embodiment of the invention. In FIG. 30, a magnet moving body 3 includes: two hollow cylindrical rare-earth permanent magnets 5A, 5B arranged with the same poles thereof confronting each other; a hollow cylindrical intermediate magnetic substance 6 interposed between these permanent magnets 5A, 5B; hollow disc-like outer end magnetic substances 26 arranged on the outer sides of the permanent magnets 5A, 5B; and hollow disc-like cushion plates 27A, 27B arranged on the outer sides of the outer end magnetic substances 26 with a through shaft body 8 made of a metal being inserted therethrough. The through shaft body 8 is held by causing clampers (E rings made of a metal) 20 to be fitted into fitting grooves 29 of the through shaft body 8, so that the permanent magnets 5A, 5B, the intermediate magnetic substance 6, the outer end magnetic substances 26, and the disc-like cushion plates 27A, 27B are fixed on the metallic through shaft body 8. The through shaft body 8 is made of either a nonmagnetic or magnetic metal. The cushion plates 27A, 27B are made of an elastic material such as silicon rubber, and are interposed between a pair of fasteners 20 while compressed slightly. As a result, the cushion plates 27A, 27B can absorb variations in the thickness of the respective permanent magnets 5A, 5B and the magnetic substances 6, 26, thereby preventing play of these components. An adhesive may additionally be used for integrating the metallic through shaft body 8 with the permanent magnets 5A, 5B and the magnetic substance 6. The thickness of each outer end magnetic substance 26 is designed about half or same (50 to 100%) of the intermediate magnetic substance 6. Other configurational aspects of this embodiment are the same as those of the ninth embodiment.

In the twelfth embodiment, since the outer end magnetic substances 26 are arranged on the outer end surfaces of the permanent magnets 5A, 5B of the magnet moving body 3, the magnetic flux radiated from the magnetic poles on the outer end surfaces of the permanent magnets 5A, 5B are easy to bend perpendicularly due to the presence of the outer end magnetic substances 26. For this reason or the like, the vertical component of the magnetic flux density (the component perpendicular to the axial direction of the permanent magnets) in the outer side portion of the permanent magnets 5A, 5B increases. That is, the magnetic flux density perpendicular to the longitudinal direction of the magnet moving body 3A which contributes to producing a thrust to be produced based on the Fieming's left hand rule can be increased. A still larger thrust can be produced by applying current to the three coils 2A, 2B, 2C wound annularly around the magnet moving body 3 so that a magnetic field of opposite polarity can be generated alternately. For example, an improvement in thrust by up to 10% or so can be obtained compared with the ninth embodiment involving no outer end magnetic substances.

While the magnet moving body 3 formed of the two permanent magnets arranged with the same poles thereof confronting each other and the magnetic substance interposed therebetween has been exemplified in the ninth to eleventh embodiments, the magnet moving body may be formed of three or more permanent magnets with the same poles thereof confronting each other and magnetic substances interposed therebetween. In this case, the number of coils can be increased to four or more to match the increase in the number of permanent magnets.

Further, while the magnet moving body 3 formed of the two permanent magnets arranged with the same poles thereof confronting each other, the intermediate soft magnetic substance interposed therebetween, and the outer end magnetic substances arranged on the outer sides of the two permanent magnets has been exemplified in the twelfth embodiment, the magnet moving body may be formed of three or more permanent magnets with the same poles thereof confronting each other and magnetic substances interposed therebetween. In this case, the number of coils can be increased to four or more to match the increase in the number of permanent magnets. In addition to the configuration of the twelfth embodiment, the compression springs 24 or the annular permanent magnets 25 for biasing the magnet moving body back to the middle position as described in the tenth and eleventh embodiments may, of course, be arranged.

Still further, while both ends of the through shaft body of the magnet moving bodies 3, 3A are supported by the bearings in the ninth to twelfth embodiments, such a structure that only one side of the through shaft body may be supported by the bearing may be applicable. In this case, only one bearing is used (however, it is desirable to use a longer bearing member).

Figure 31:
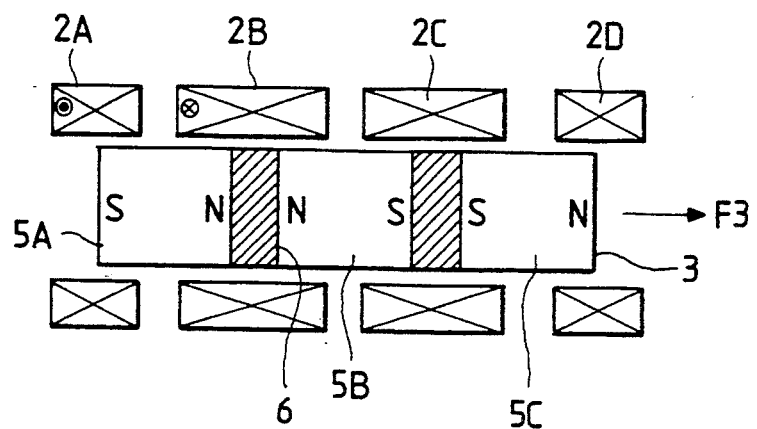
FIG. 31 is a schematic diagram showing a magnet-type actuator having three permanent magnets confronting same poles thereof, and four coils corresponding to the permanent magnets.

As described above, in the first to twelfths embodiments of the present invention, while the magnet moving body formed of the two permanent magnets arranged with the same poles thereof confronting each other and the magnetic substance interposed therebetween has been exemplified, the magnet moving body may be formed of three or more permanent magnets with the same poles thereof confronting each other and magnetic substances interposed therebetween as shown in FIG. 31. In this case, the number of coils can be increased to four or more to match the increase in the number of permanent magnets.

Still further, such a structure that the coils 2A, 2B, 2C are fixed on the inner circumferential side of the yoke 1 with insulation may also be adopted without the guide sleeve 4.

Still further, while the sleeve-like yoke 1 and the guide sleeve 4 are used in the above-described embodiments, a square pillar-shaped yoke or guide sleeve may also be used. In this case, each coil may be wound around the outer circumference of the magnet moving body as in the other cases.

As described in the foregoing pages, the moving magnet-type actuator of the invention is characterized as forming a magnet moving body by interposing a magnetic substance between at least two permanent magnets, the same poles of the permanent magnets confronting each other. As a result of the configuration, a magnetic flux component perpendicular to the longitudinal direction of the magnet moving body (the direction in which the permanent magnets are magnetized) can be sufficiently increased. In addition, since at least three coils are wound around the outer circumference of the magnet moving body so that the current in the coils can cut across the magnetic flux produced from the magnetic poles of the magnet moving body effectively, a thrust to be generated between the vertical magnetic flux component and the current flowing through the respective coils based on the Fieming's left hand rule can be increased to a sufficient degree. Consequently, the moving magnet-type actuator capable of providing a large thrust by a small structure and a small current can be achieved.

Further, the moving magnet-type actuator of the device is characterized as forming a magnet moving body by interposing a magnetic substance between at least two permanent magnets with the same poles of the permanent magnets confronting each other, and by accommodating and fixing these components in a nonmagnetic sleeve-like holder. As a result of the configuration, the magnet moving body is made into a rigid structural body with improved wear resistance.

Furthermore, the magnet moving body has a feature that the output extracting pin is arranged on one side thereof, so that the movement of the magnet moving body can be made smooth by supporting the pin with the bearing member that maintains a predetermined positional relationship with respect to the three coils.

Still further, the moving magnet-type actuator of the invention is characterized as forming a magnet moving body by interposing an intermediate magnetic substance between at least two permanent magnets with the same poles of the permanent magnets confronting each other, and by arranging outer end magnetic substances on the outer end surfaces of the permanent magnets. This configuration contributes to sufficiently increasing a magnetic flux component perpendicular to the longitudinal direction of the magnet moving body (the direction in which the permanent magnets are magnetized), such component being derived not only from the portion at which the same poles of the permanent magnets confront each other, but also from the outer end portions of the permanent magnets. In addition, since at least three coils are formed around the outer circumference of the magnet moving body so that the current in the coils can cut across the magnetic flux produced from the magnetic poles of the magnet moving body effectively, a thrust to be generated between the vertical magnetic flux component and the current flowing through the respective coils based on the Fieming's left hand rule can be increased to a sufficient degree. Consequently, the moving magnet-type actuator capable of providing a large thrust by a small structure and a small current can be achieved.

Furthermore, the moving magnet-type actuator of the device is characterized as forming a magnet moving body by interposing an intermediate magnetic substance between at least two permanent magnets and integrating these components with a through shaft body, the same poles of the two permanent magnets confronting each other and the through shaft body being supported slidably by bearing members. As a result of the configuration, a magnetic flux component perpendicular to the longitudinal direction of the magnet moving body (the direction in which the permanent magnets are magnetized) can be sufficiently increased. In addition, since at least three coils are wound around the outer circumference of the magnet moving body so that the current in the coils can cut across the magnetic flux produced from the magnetic poles of the magnet moving body effectively, a thrust to be generated between the vertical magnetic flux component and the current flowing through the respective coils based on the Fieming's left hand rule can be increased to a sufficient degree. Further, the use of the through shaft body allows a plurality of permanent magnets and intermediate magnetic substances to be fixed surely, thus making the magnet moving body rigid and facilitating the assembling work therefor. The use of the through shaft body also dispenses with a nonmagnetic holder or the like for covering the outer circumference of the permanent magnets and the intermediate magnetic substance for their integration, thereby contributing to a further improvement of thrust while decreasing the gap between the outer circumference of the permanent magnets and the respective coils. Still further, by supporting the through shaft body functioning as an output extracting pin of the magnet moving body with the bearing members that maintain a predetermined positional relationship with respect to the three coils, the magnet moving body can move smoothly. Consequently, a highly reliable moving magnet-type actuator that can produce a large thrust by a small structure and a small current can be achieved.

What is claimed is:

1. A moving magnet-type actuator comprising:
    a magnet moving body including at least two permanent magnets and an intermediate magnetic substance interposed between said permanent magnets, the same poles of said permanent magnets confronting each other; and
    at least three coils being connected to flow current in different directions with a zone between magnetic poles of the permanent magnets as a boundary;
    wherein said magnet moving body is movably arranged inside said coils.

2. A moving magnet-type actuator according to claim 1, wherein said magnet moving boy further comprises a nonmagnetic sleeve-like holder for accommodating said permanent magnets and said intermediate magnetic substance to fix inside said nonmagnetic sleeve-like holder, wherein the magnet moving body is arranged so as to be movable inside said coils.

3. A moving magnet-type actuator according to claim 1, wherein said magnet moving body further comprises an output extracting pin on at least one outer end surface of said permanent magnets;
    said actuator further comprising a bearing member for slidably supporting said output extracting pin so that a predetermined positional relationship is maintained with respect to the three coils.

4. A moving magnet-type actuator according to claim 1, further comprising a nonmagnetic guide sleeve for movably guiding said magnet moving body and a magnet attracting body for attracting said magnet moving body, which is arranged on at least one end of said nonmagnetic guide body.

5. A moving magnet-type actuator according to claim 1, wherein the magnet moving body further comprises at least one of outer end, magnetic substances on outer end surface of said permanent magnets.

6. A moving magnet-type actuator according to claim 1, wherein each of said permanent magnets and said intermediate magnetic substance has a center hole, and a shaft body being slidably supported by bearing members passes through said center holes of said permanent magnets and intermediate magnetic substance.

7. A moving magnet-type actuator according to claim 1, further comprising springs for biassing said magnet moving body to back to a center position, said springs being disposed at ends of said coils.

8. A moving magnet-type actuator according to claim 1, further comprising return permanent magnets for generating repulsive force against the magnet moving body to return to a center position, said return permanent magnets being disposed at ends of said coils.

9. A moving magnet-type actuator according to claim 6, wherein the permanent magnets and the intermediate magnetic substance are fixed on the through shaft body by clamping rings being fitted into the through shaft body.

10. A moving magnet-type actuator according to claim 1, further comprising: a sleeve-like magnetic substance arranged around outer circumferences of the coils to form a magnetic circuit for increasing a magnetic flux component in a direction perpendicular to a direction of magnetization of the permanent magnets.

11. A moving magnet-type actuator according to claim 1, wherein said permanent magnets are rare-earth magnets having a maximum energy product (B-H max) at least 18 MGOe (=140 KJ/m$^3$).

12. A moving magnet-type actuator according to claim 1, wherein a thickness of said intermediate magnetic substance is designed to be within a range of 0.1 to 1.0 times of a length of said permanent magnets.

13. A moving magnet-type actuator according to claim 1, wherein an outer diameter of said coils are designed to be within a range 1.2 to 3.5 times of an outer diameter of said permanent magnets.

14. A moving magnet-type actuator according to claim 5, wherein a thickness of said outer end magnetic substances is designed to be within a range of 0.5 to 1.0 times of a length of said permanent magnets.

15. A moving magnet-type actuator according to claim 1, further comprising cushion plates at outer face of said permanent magnets.

16. A moving magnet-type actuator according to claim 5, further comprising cushion plates at outer face of said outer end magnetic substances.

* * * * *

UNITED STATES PATENT AND TRADEMARK OFFICE
CERTIFICATE OF CORRECTION

PATENT NO. : 5,434,549
DATED : July 18, 1995
INVENTOR(S) : Yasuyuki HIRABAYASHI, et al.

It is certified that error appears in the above-indentified patent and that said Letters Patent is hereby corrected as shown below:

On the title page, Item [30], the fifth Foreign Application Priority Date should read:

--Jul. 20, 1992--

Signed and Sealed this

Seventh Day of November, 1995

*Attest:*

BRUCE LEHMAN

*Attesting Officer*　　　*Commissioner of Patents and Trademarks*